(12) United States Patent
Gupta et al.

(10) Patent No.: US 11,609,696 B2
(45) Date of Patent: *Mar. 21, 2023

(54) PROVIDING A RELIABLE DISTRIBUTED QUEUING SERVICE

(71) Applicant: Amazon Technologies, Inc., Seattle, WA (US)

(72) Inventors: Vikas Gupta, Bangalore (IN); John D. Cormie, Seattle, WA (US); Duane J. Krause, Seattle, WA (US); Nipoon Malhotra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 145 days.

This patent is subject to a terminal disclaimer.

(21) Appl. No.: 17/000,184

(22) Filed: Aug. 21, 2020

(65) Prior Publication Data

US 2021/0042040 A1 Feb. 11, 2021

Related U.S. Application Data

(63) Continuation of application No. 15/464,098, filed on Mar. 20, 2017, now Pat. No. 10,754,554, which is a
(Continued)

(51) Int. Cl.
*G06F 3/06* (2006.01)
*G06F 16/958* (2019.01)
*G06F 9/54* (2006.01)

(52) U.S. Cl.
CPC ............ *G06F 3/0613* (2013.01); *G06F 3/065* (2013.01); *G06F 3/067* (2013.01); *G06F 3/0614* (2013.01);
(Continued)

(58) Field of Classification Search
CPC ...................................................... G06F 3/0613
See application file for complete search history.

(56) References Cited

U.S. PATENT DOCUMENTS 6,968,051 B1 11/2005 Wood
6,968,367 B1 11/2005 Vassar et al.
(Continued)

OTHER PUBLICATIONS

Naraine, R., "Amazon.com as an Infastructure Platform?" Nov. 15, 2004, retrieved Nov. 17, 2004, from http://www.eweek.com/print article2/0,2533,a= 139332,00.asp, 2 pages.
(Continued)

*Primary Examiner* — Van H Oberly
(74) *Attorney, Agent, or Firm* — Alexander A. Knapp; Kowert, Hood, Munyon, Rankin & Goetzel, P.C.

(57) ABSTRACT

A method, system, and computer-readable medium is described for facilitating interactions between software programs by providing a reliable data queuing service that enables the programs to store and retrieve elements of data queues. In some situations, the data queuing service is provided to users who purchase usage of the data queuing service for application programs executed by or otherwise affiliated with the users. In addition, accessibility of the data queuing service to remote executing programs may be enhanced via a defined API of the data queuing service, such as a Web services-based API. Availability of the data queuing service may also be enhanced in some situations by using multiple alternative distributed systems for a data queue such that each of the alternative systems stores a subset of the elements of the data queue.

20 Claims, 11 Drawing Sheets

Related U.S. Application Data continuation of application No. 13/738,819, filed on Jan. 10, 2013, now Pat. No. 9,632,723, which is a continuation of application No. 10/967,109, filed on Oct. 15, 2004, now Pat. No. 8,370,395.

(52) U.S. Cl.
CPC .......... *G06F 3/0619* (2013.01); *G06F 3/0683* (2013.01); *G06F 16/958* (2019.01); *G06F 9/54* (2013.01)

(56) References Cited

U.S. PATENT DOCUMENTS

| | | | |
|---|---|---|---|
| 6,973,498 | B1 | 12/2005 | Juster et al. |
| 8,370,395 | B1 | 2/2013 | Gupta et al. |
| 9,632,723 | B1 | 4/2017 | Gupta et al. |
| 10,754,554 | B2 | 8/2020 | Gupta et al. |
| 2002/0038228 | A1 | 3/2002 | Waldorf et al. |
| 2002/0111929 | A1 | 8/2002 | Pudipeddi et al. |
| 2003/0182261 | A1 | 9/2003 | Patterson |
| 2003/0182464 | A1* | 9/2003 | Hamilton ............... G06F 9/546 709/213 |
| 2003/0188038 | A1 | 10/2003 | Le et al. |
| 2004/0034664 | A1* | 2/2004 | Jain ................... G06F 9/544 |
| 2004/0243641 | A1 | 12/2004 | Allen et al. |
| 2005/0086384 | A1 | 4/2005 | Ernst |
| 2005/0198085 | A1 | 9/2005 | Blakey et al. |

OTHER PUBLICATIONS

"AcrossCommunications Web Services," retrieved Sep. 14, 2004, from http://ws.acrosscommunications.com/, 1 page.

"AcrossCommunications Web Services—Queue," retrieved Sep. 14, 2004, from http://ws.acrosscommunications.com/Queue.asmx?, 1 page.

"AcrossCommunications Web Services—Queue—Service Description," retrieved Sep. 14, 2004, from http://ws.acrosscommunications.com/Queue.asmx?wsdl, 4 pages.

"Web Service Message Queue (WSMQ): Workspace Home," retrieved Oct. 15, 2004, from http://www.gotdotnet.com/Workspaces/Workspace.aspx?id=74d9a69e-3bbc-48fe-aedl-94bf87f50I4c, 2 pages.

"Announcing: WSMQ and XMLQ," retrieved Oct. 15, 2004, from http://dotnetiunkies.com/W ebLog/bsblog/archive/2004/08/12/21844.aspx, 2 pages.

Du, H., et al., "Building a JMS Web service using SOAP over JMS and WebSphere Studio," Feb. 2004, retrieved Oct. 15, 2004, from http://www-106.ibm.com/develooerworks/websohere/librarv/techarticles/0402 du/0402 du.html, 20 pages.

* cited by examiner

PROVIDING A RELIABLE DISTRIBUTED QUEUING SERVICE

This application is a continuation of U.S. patent application Ser. No. 15/464,098, filed Mar. 20, 2017, which is a continuation of U.S. patent application Ser. No. 13/738,819, filed Jan. 10, 2013, now U.S. Pat. No. 9,632,723, which is a continuation of U.S. patent application Ser. No. 10/967,109, filed Oct. 15, 2004, now U.S. Pat. No. 8,370,395, which are hereby incorporated by reference herein in their reference.

TECHNICAL FIELD

The following disclosure relates generally to facilitating interactions between executing software programs, and more particularly to facilitating such interactions by providing a data queuing service to remote executing programs, such as a data queuing service that uses distributed storage systems to reliably store elements of data queues for the remote executing programs.

BACKGROUND

Multiple computer systems often interact in order to achieve a goal, such as when an application program on a computer system interacts with other remote systems and applications in order to obtain various types of information and functionality that are not part of the application program. By performing such interactions, an application program may be able to leverage information and functionality from vast numbers of other computer systems over the Internet or other networks.

In order to enable such interactions between remote computer systems and application programs, various programmatic interaction mechanisms have been developed. For example, remote procedure call ("RPC") protocols have long existed that allow a program on one computer to cause a program on another computer to be executed, and various object-oriented architectures such as CORBA ("Common Object Request Broker Architecture") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via executing Web browser applications of the users) and receiving the requested information in response. In addition to such interactive user specification of requested information, there is also growing use of the Web to support the programmatic interaction of remote applications to exchange information via defined APIs ("application program interfaces"), such as APIs based on Web services interaction mechanisms. Such Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Unfortunately, while Web services and other programmatic interaction mechanisms allow various application programs and computers to interact, such interactions are typically limited in various ways. For example, the types of information and functionality that are available to be requested using such programmatic interactions are typically restricted to very limited types of requests that the remote computer systems and applications can automatically fulfill (e.g., to provide a specified predefined group of information, such as a Web page or file, or to perform a specified database query on a specified database), but there are often additional needed capabilities that are not available as part of the existing programmatic interaction mechanisms.

As one example of additional programmatic interaction capabilities that are often needed, one or more "source" (or "producer") software programs may often need to provide multiple groups of data (e.g., messages) over time to one or more other "destination" (or "consumer") software programs in a sufficiently reliable manner that the provided groups of data are rarely or never lost. However, such reliable data exchange creates various difficulties. As a threshold issue, the source and destination programs will typically need to be known to each other at design time so that they can be created in such a manner as to enable the data exchange interaction, such as by creating and including specialized functionality in the source and/or destination programs to enable the data exchange. Moreover, to actually perform the data exchange, the source and destination programs will both typically need to be simultaneously executing and accessible to each other, and the data exchange is susceptible to the loss of data in various situations, such as due to an occurrence of an error in or unexpected termination of one of the programs or based on a network error that interrupts communication between the programs. In addition, a common problem in such situations occurs when the source and destination programs have different abilities to process data, such as the source programs being able to send data more quickly than the destination programs can receive and process data—if so, complicated predefined techniques may be needed to regulate the flow of data, or instead groups of data being exchanged may be lost. Another common problem occurs in situations in which multiple programs wish to exchange data with multiple other programs, as such interactions are often difficult to organize and coordinate.

Thus, given the existing limitations regarding exchange of data between programs, it would be beneficial to provide a solution that enables software programs to reliably exchange data in such a way as to minimize or eliminate existing problems, as well as to provide a variety of additional capabilities.

DETAILED DESCRIPTION

A software facility is described that facilitates interactions between software programs by providing a data queuing service that enables remote programs to store and retrieve elements of queues, with the queue elements able to store a variety of types of data in various embodiments. In some embodiments, the data queuing service is provided by or otherwise affiliated with a merchant (e.g., a Web merchant) who sells access to or usage of the data queuing service to customers so that application programs executed by or otherwise affiliated with the customers can use the data queuing service. In addition, in some embodiments accessibility of the data queuing service is provided to remote executing programs via a defined API ("application program interface") of the data queuing service, such as an API based on Web services functionality that is provided by the data queuing service.

In at least some embodiments, the data queuing service is provided using a distributed storage architecture to enhance aspects of the service. For example, availability of the data queuing service is enhanced in at least some embodiments by using a group of multiple alternative distributed storage systems for a data queue such that each of the alternative systems stores a subset of the elements of the data queue—in this manner, a new data element being added to a queue (also referred to as being "enqueued") can be stored on any of the alternative systems, such as to balance the storage and/or computing load on the alternative systems, and to handle the situation when an alternative system becomes unavailable (e.g., due to hardware failure of the system and/or a network connectivity failure) by storing new data elements on other alternative systems. In addition, reliability of the data queuing service is enhanced in at least some embodiments by using one or more mirror storage systems for each of the alternative storage systems, such that each of the mirror systems replicates data queue elements stored on the alternative system that it mirrors—in this manner, if an alternative system becomes unavailable, queue elements stored on that alternative system may still be available on one of the mirror systems for that alternative system.

Figure 1:
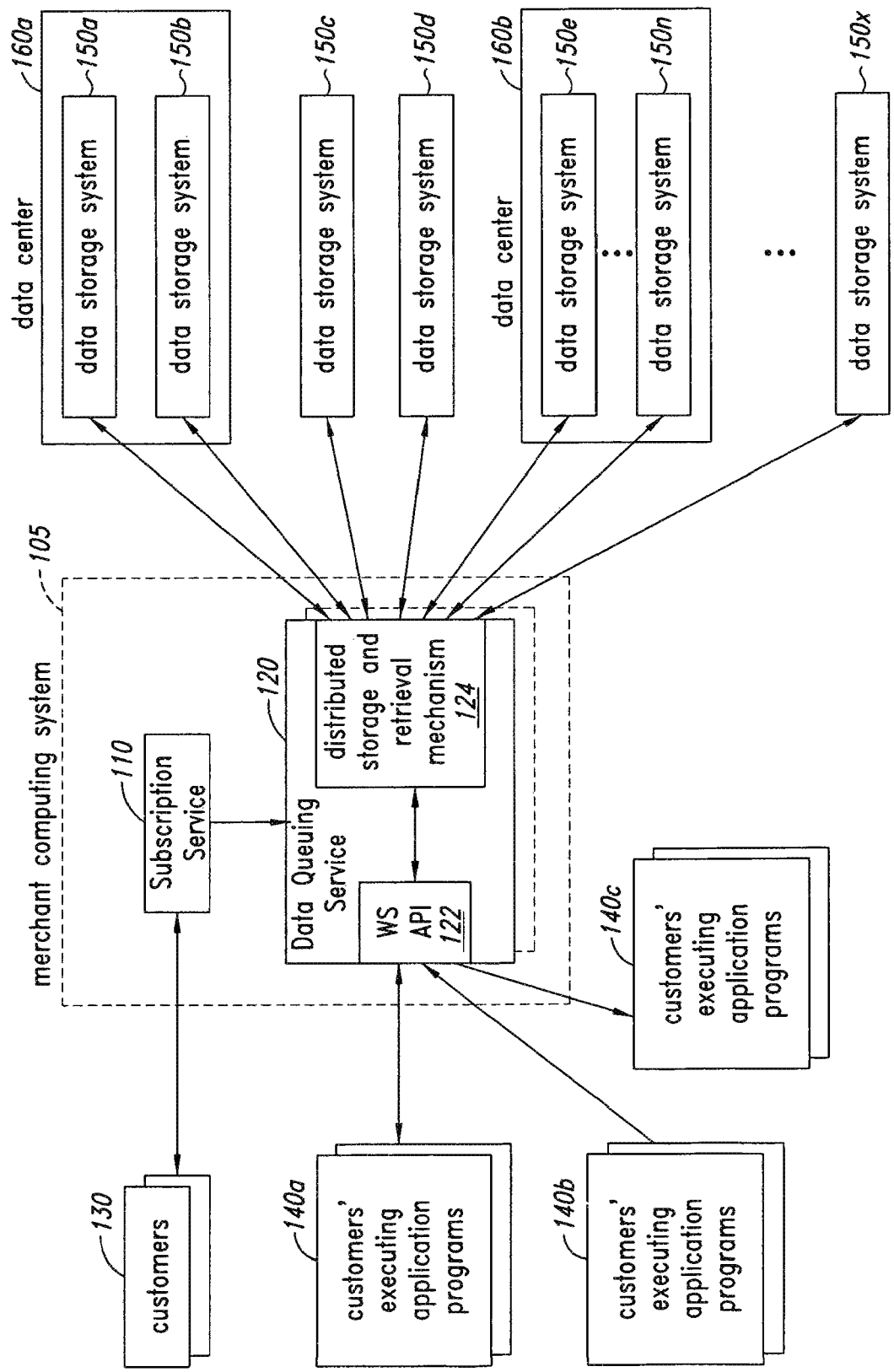
FIG. 1 is a network diagram illustrating interactions and information flow for an example embodiment of a reliable data queuing service.

FIG. 1 illustrates an example of providing a data queuing service using a distributed storage architecture. For illustrative purposes, some embodiments are described below in which specific types of queue-related capabilities and functionalities are provided in various specific ways, although those skilled in the art will appreciate that the techniques of the invention can be used in a wide variety of other situations and that the invention is not limited to the exemplary details provided.

In the example embodiment illustrated in FIG. 1, various customers 130 first interact with a subscription service 110 of a merchant to create subscriptions that allow access to various functionality provided by the merchant. In particular, the customers in this example embodiment may create subscriptions that are associated with a data queuing service 120 provided by the merchant, such as by creating one or more queues and associating them with their subscriptions, after which one or more executing application programs 140 of a customer may interact with the data queuing service to use one or more of the customer's queues. In the illustrated embodiment, the subscription service and data queuing service are both provided by a single merchant computing system 105, although in other embodiments the services may execute on distinct computing systems and/or may be operated by distinct entities, or the data queuing service and subscription service may instead be combined into a single service.

In this example embodiment, a variety of types of information can be specified for a subscription to affect use of any data queues associated with the subscription. For example, information related to payments for queue-related actions may be specified for a subscription, such as to specify a payment source for a queue that is provided on a per-fee basis (e.g., a queue that charges fees on an aggregate basis for a certain number of queue operations and/or for a certain time, that charges fees on a per-queue operation basis, etc.). Various configuration information related to the subscription and/or associated queues can also be specified, such as to specify usage restrictions for the queues (e.g., a throughput ceiling and/or storage size ceiling), to specify access control restrictions for users of the queues (e.g., to limit some users to only certain queue-related operations, such as a "read" operation to obtain stored data from a queue, or to restrict some users from any access to a queue), and/or to specify other types of queue-related information (e.g., to specify a degree or level of reliability and/or availability for the queue).

After a customer indicates to create a queue associated with a subscription, which in the illustrated embodiment is performed based on interactions of the customer with the subscription service, the subscription service interacts with the data queuing service 120 to obtain a unique queue identifier for the queue. The subscription service then associates the identifier with the subscription of the customer, and provides the queue identifier to the customer, although in other embodiments the subscription service may instead generate the queue identifier itself or the customer may instead interact directly with the data queuing service to create the queue. Executing programs that are affiliated with the customer can then use the queue identifier to access the customer's queue via the data queuing service in various ways, such as to allow multiple Web applications of the customer that execute remotely from each other and from the queue to use the queue to communicate. For example, executing application programs 140a and 140b may interact with a Web services-based API 122 of the data queuing service to act as producer programs that enqueue data in queues created by customers affiliated with the application programs, and executing application programs 140a and 140c may then interact with the API to act as consumer programs that retrieve the enqueued data in a manner convenient to those consumer programs.

Since the data queuing service acts as an intermediary in the illustrated embodiment when interacting with remote third-party programs of customers, the queuing service can be used by customers' programs in a variety of ways. For example, in some situations a single application program 140a may store data in a queue and later retrieve and use that data, such as to use the queue for buffering purposes to hold incoming data that the application is not able to immediately process, or instead to store data temporarily while the application program is not executing. Alternatively, some application programs (e.g., programs 140b) may act solely as data producers who enqueue data that is later retrieved by other application programs (e.g., programs 140c) who act only as consumers of the enqueued data. Such decoupling of data producers and consumers not only accommodates different abilities to provide and consume data (e.g., the ability to process data at different rates), but also allows multiple unrelated applications to provide data to a single queue and/or allows multiple unrelated applications to retrieve data from a single queue. In addition, such producer and consumer application programs do not need to execute simultaneously, since the data queuing service in this example embodiment will reliably store data until it is dequeued (e.g., in accordance with the level and type of queuing services subscribed to for the queue), and further allows the producer and consumer applications to be heterogeneous with respect to programming language, operating systems, computing hardware, etc. as long as they are both able to access one or more APIs provided by the data queuing service. As another example, one or more of the executing application programs 140a may act as a data producer for one queue and a data consumer for another queue, whether simultaneously or at different times.

When the API 122 of the data queuing service receives queue usage operation requests, such as to enqueue, read or dequeue data elements, the API forwards the requests to one or more components 124 that in the illustrated embodiment provide distributed storage and retrieval functionality for queued data based on interactions with distributed data storage systems 150. The data storage systems may take various forms in various embodiments, including computing systems with attached or otherwise associated storage, database servers for databases, stand-alone network storage devices, etc. Furthermore, there may optionally be multiple copies of the data queuing service executing simultaneously in some embodiments (whether on a single computing system or multiple computing systems), such as to allow greater throughput of queue usage operations—if so, such multiple copies will interact with a single set of distributed data storage systems in the illustrated embodiment, although in other embodiments such multiple copies may instead be associated with distinct sets of data storage systems. If multiple data queuing service copies are executing simultaneously, requests via the API can be forwarded to an appropriate one of the copies in various ways, such as via the use of a load balancer (not shown).

In this example embodiment, the distributed data storage systems assist to provide high availability and high reliability for the data queuing services. In particular, each queue may be associated with a group of multiple alternative data storage systems 150 that each store a subset of the data elements for the queue, and each such alternative data storage system may have at least one other data storage system that mirrors the alternative system in order to provide a redundant copy of the enqueued data elements, as discussed in greater detail with respect to FIGS. 2A-2C. In this example embodiment, at least some of the distributed data storage systems may also be clustered together, such as by using multiple data centers 160 that each include multiple data storage systems, although other data storage systems (e.g., 150c and 150d) are stand-alone systems in this illustrated embodiment. When selecting a data storage system to mirror another data storage system, the mirror data storage system in this example embodiment is chosen in such a manner as to maximize the likelihood that the failure of one of the data storage systems does not result in the failure of the other data storage systems. For example, to select a mirror data storage system for system 150a in data center 160a, the mirror data storage system will typically be selected outside of data center 160a (e.g., data storage system 150e in data center 160b) so that a failure of power and/or connectivity to data center 160a will not result in a loss of access to the mirror storage system. While in some embodiments a data storage system may act as a mirror for multiple other data storage systems, assignments of mirror systems are also performed in such a manner as to prevent overloading of the mirror systems.

Figure 2A:
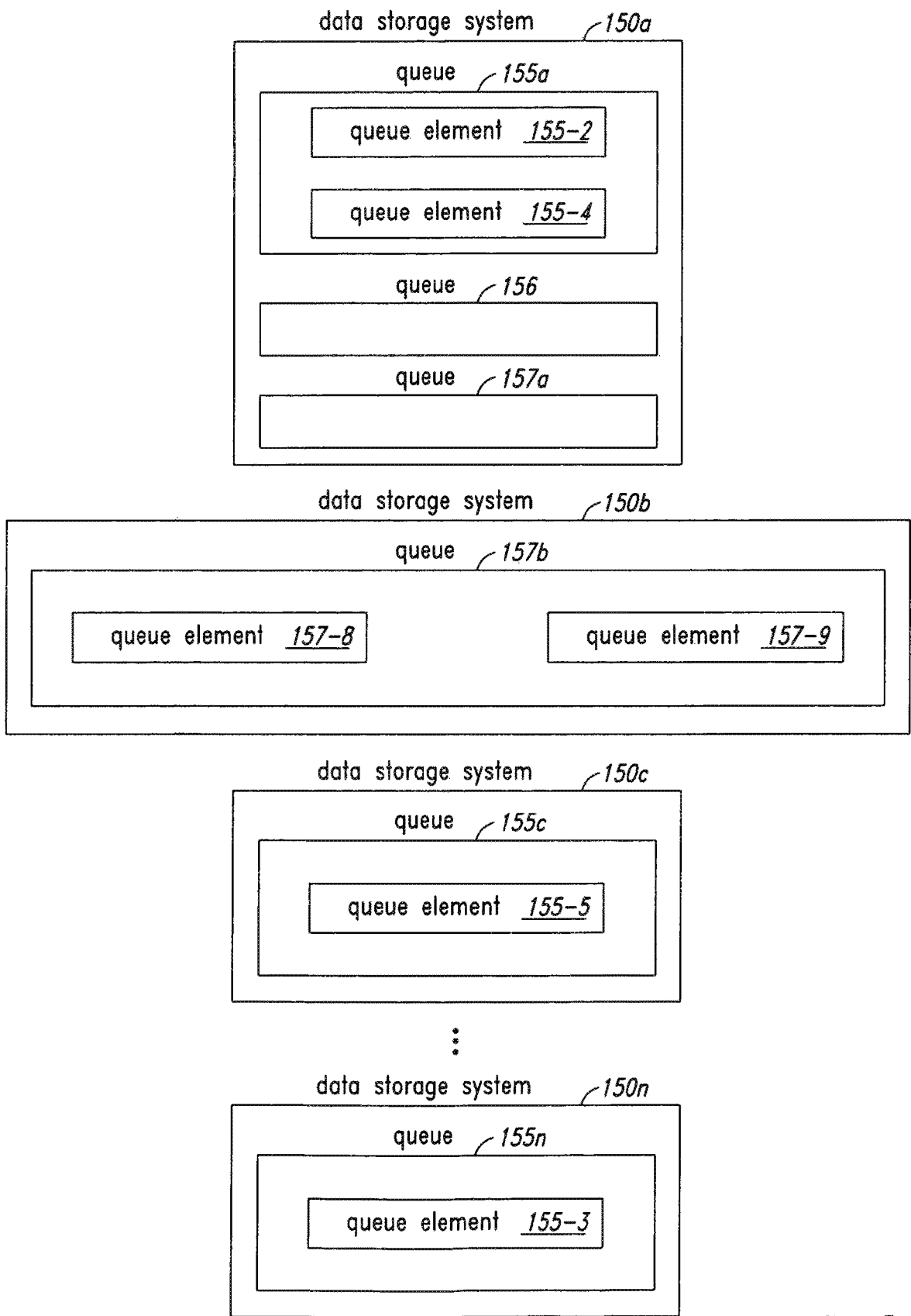
FIGS. 2A-2C illustrate examples of using a distributed storage system to provide a reliable data queuing service.
Figure 2B:
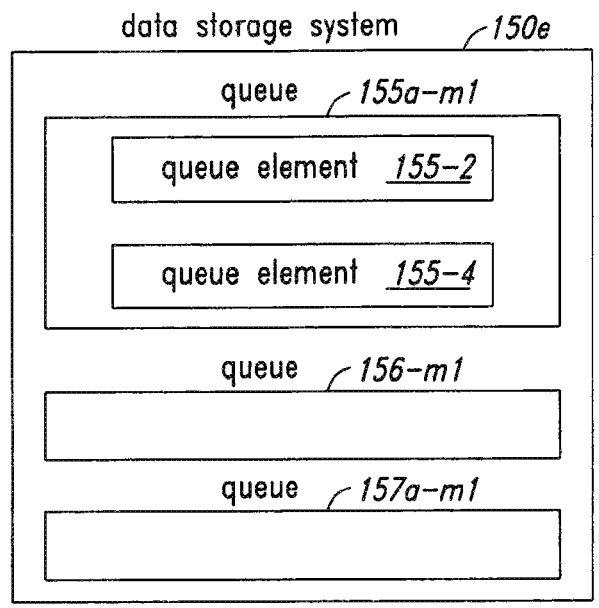
Figure 2B:
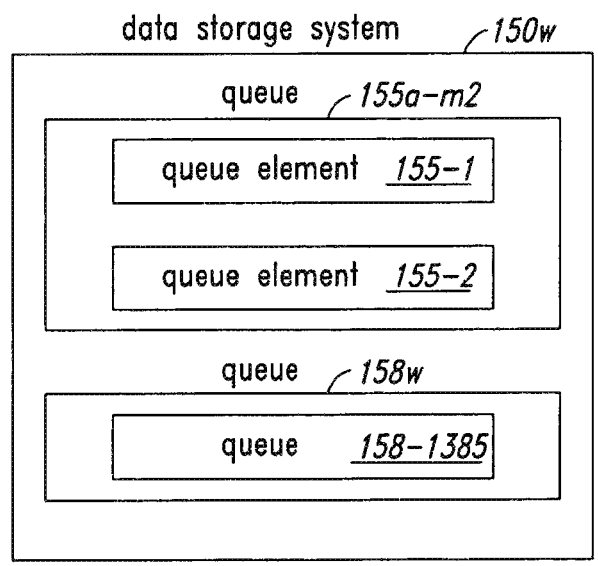
Figure 2C:
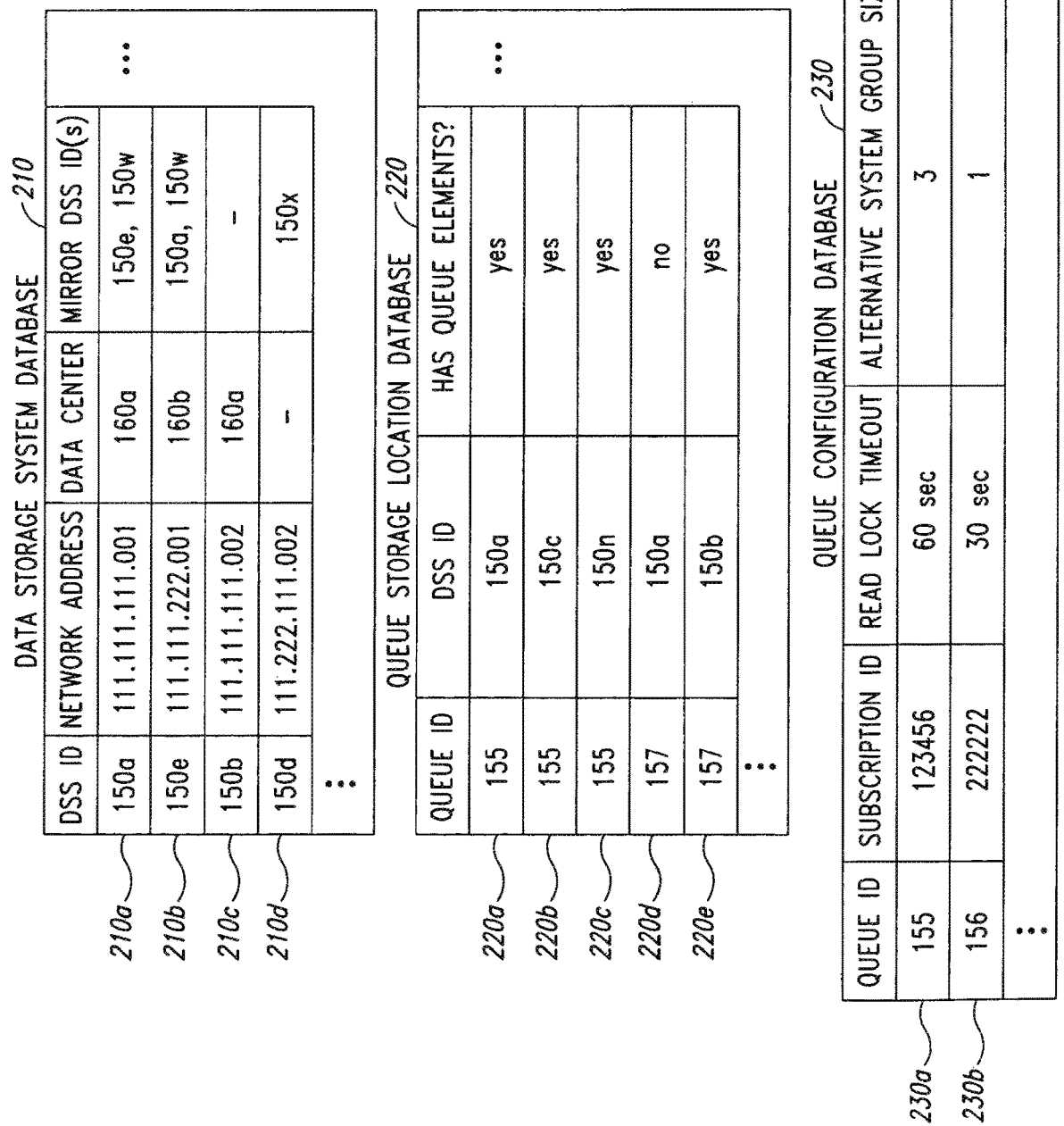

FIGS. 2A-2C illustrate examples of using a distributed storage system to provide a data queuing service. In these illustrated examples, the number of queues, queue elements, and data storage systems (and the corresponding number of database entries) have been minimized for purposes of clarity, but those of skill in the art will appreciate that other embodiments may provide for much larger numbers of queues, queue elements, and data storage systems (e.g., millions or more of queues and queue entries).

In particular, FIG. 2A illustrates examples of how the data queuing service 120 of FIG. 1 may store queue elements in a distributed manner among the data storage systems 150 of FIG. 1, with three queues 155, 156 and 157 being stored on several of the data storage systems in the illustrated example of FIG. 2A. For example, queue 155 in this example is stored across three alternative data storage systems that each may store subsets of the queue elements, with data storage system 150a storing a portion 155a of the queue that currently includes 2 queue data elements (those being queue elements 155-2 and 155-4), data storage system 150c storing a portion 155c of the queue that currently includes 1 queue data element (that being queue element 155-5), and data storage system 150n storing a portion 155n of the queue that currently includes 1 queue data element (that being queue element 155-3). In this example, queue data element 155-1 was previously enqueued in queue portion 155a and subsequently dequeued.

When a new data element is to be enqueued in queue 155, any of the three alternative data storage systems may be selected to store the new data element, and when a stored data element is to be read from the queue, any of the three alternative data storage systems may similarly be selected for use in satisfying the read request (although if one of the alternative data storage systems did not currently have any stored data elements and others did, then that one data storage system would not be selected). Thus, when a request to read a queue element from queue 155 is next received, it is possible that data storage system 150c will be selected to handle the request, thus allowing queue element 155-5 to be returned before earlier-enqueued queue elements on data storage systems 150a and 150b. However, when a queue element is next read from queue portion 155a on data storage system 150a, the earliest enqueued of the two data elements in that queue portion (in this example 155-2) will be selected, thus preventing queue elements to become stuck in the queue. While the illustrated embodiment thus provides a relaxed FIFO ("First In, First Out") queue behavior in which enqueued data will be dequeued in a timely manner but not necessarily in the exact order enqueued, in other embodiments other queue behaviors may instead be provided, such as to provide strict FIFO ordering (with enqueued data being dequeued in the order enqueued), to provide relaxed or strict LIFO ("Last In, First Out") queue behavior, and/or to use other element ordering schemes, such as for a priority queue (e.g., by using priorities associated with queue elements).

Queue 157 is similarly stored across two alternative data storage systems in the example shown in FIG. 2A, with data storage system 150a storing a portion 157a of the queue that currently does not include any queue data elements, and with data storage system 150b storing a portion 157b of the queue that currently includes 2 queue data elements (those being queue elements 157-8 and 157-9). In addition, in this example queue 156 is stored in a single data storage system, that being data storage system 150a, and does not currently include any queue data elements (e.g., due to queue 156 currently being suspended or inactive, such as due to the subscription associated with the queue (not shown) having expired). In some embodiments, the number of alternative data storage systems may be configurable for some or all queues (e.g., by the customer and/or the merchant), such as to accommodate different levels or types of queue capabilities purchased or otherwise requested by a customer, or instead to accommodate varying numbers of currently available data storage systems (based on existing data storage systems becoming unavailable and/or new data storage systems becoming available), while in other embodiments the number of alternative data storage systems may be fixed for all queues. In addition, in some embodiments the multiple alternative data storage systems to use for a queue may be dynamically determined (e.g., using a deterministic algorithm) at the time of each of some or all types of queue operations for the queue (e.g., for enqueue operations), such as to easily handle changes to data storage systems that are available.

FIG. 2B illustrates examples of how the data queuing service 120 of FIG. 1 may store queue elements among the data storage systems 150 of FIG. 1 in a manner so as to enhance reliability of the queued elements. In particular, FIG. 2B illustrates two additional data storage systems 150e and 150w that have been selected to mirror at least portions of data storage system 150a illustrated in FIG. 2A—while not illustrated here, such mirror systems will also be selected and used for other data storage systems that store queue elements, such as data storage systems 150b, 150c and 150n illustrated in FIG. 2A.

In the illustrated example, data storage system 150e mirrors all of the queues stored on data storage system 150a, and consequently includes a queue portion 155a-m1 that mirrors queue portion 155a of system 150a, a queue 156-m1 that mirrors queue 156 of system 150a, and queue portion 157a-m1 that mirrors queue portion 157a of system 150a. In particular, for each queue-related operation that is performed with respect to queue elements for system 150a, the same queue-related operation is attempted to be performed for mirror system 150e. Thus, if system 150a were to become unavailable, mirror system 150e would be able to take its place in handing queue-related operations for queues 155, 156 and 157.

In embodiments in which a queue-related operation is guaranteed to be successfully performed against a system and all its mirror systems, those systems should always have the same contents. However, such systems may result in lower availability for the data queuing service, as a queue-related operation will fail if the operation fails for any of the system and its mirror systems. Data storage system 150w of FIG. 2B illustrates that in this example embodiment, some queue-related operations may be treated as successful even if the operation does not succeed for a system and every one of its mirror systems. In particular, system 150w also operates as a mirror system with regard to queue 155 for system 150a, and thus includes a queue portion 155a-m2 to mirror queue portion 155a of system 150a. However, in this example, queue portion 155a-m2 of system 150w does not currently have the same contents as queue portion 155a of system 150a, and in particular includes queue element 155-1 that is not currently present in queue portion 155a, and does not include queue element 155-4 that is currently present in queue portion 155a.

The inconsistency with respect to queue element 155-1 between the systems may result, for example, if a copy of the queue element was successfully enqueued in queue portion 155a-m2 but not in queue portion 155a, and has not yet been dequeued. Alternatively, copies of the queue element may have been successfully enqueued in both queue portions 155a and 155a-m2 (and perhaps in queue portion 155a-m1 as well), but a subsequent dequeue operation may have succeeded for queue portion 155a but not for queue portion 155a-m2. In the latter case, it is possible that the copy of queue element 155-1 in queue portion 155a-m2 will cause the queue element to be provided a second time to one or more queue consumers for queue 155, and furthermore that the second (or later) copy of queue element 155-1 may be provided after other later enqueued elements have been provided (e.g., after queue element 155-5 from queue portion 155c of system 150c)—this behavior is particularly likely in embodiments in which any of a data storage system and its mirror systems may be selected to respond to a queue-related operation, such as when all such systems are treated equally with respect to queue operations rather than treating the mirror systems as secondary or backup systems. Similarly, the inconsistency between queue portions 155a and 155a-m2 with respect to queue element 155-4 may occur in various ways (e.g., an initial enqueue of the data element succeeding for queue portion 155a but not for 155a-m2), but should not cause problems with operation of queue 155 unless system 150a and other mirror systems that have stored queue element 155-4 (e.g., system 150e) fail or otherwise become inaccessible before the queue element is dequeued.

As previously noted, in the illustrated embodiment system 150w operates as a mirror system with regard to queue 155 for system 150a, but it does not operate as a mirror system for system 150a for the other queues stored on system 150a. In other embodiments, however, mirror systems may always mirror all queue elements stored on the systems being mirrored, or instead mirror systems may be selected on a per-queue element basis rather than a per-queue basis. In this example embodiment, system 150w does not replicate queue 156 or queue portion 157a from system 150a, but does include a queue portion 158w for queue 158—in this example, the queue portion 158w may be a mirrored queue portion for another system, or instead one or more other systems may mirror queue portion 158w on system 150w.

FIG. 2C illustrates examples of data stored and used by the data queuing service. In particular, in the illustrated embodiment the system maintains a data storage system database to include information about currently available data storage systems, such as example database 210 in FIG. 2C. In this example, the database 210 includes various entries 210a-210d that each correspond to a data storage system, with the database including information indicating a unique identifier of the data storage system, a network address of the data storage system (e.g., an IP address), an indication of a data center (if any) in which the data storage system is located, and indications of mirror systems for the data storage system. While not illustrated here, in some embodiments information is also obtained and stored that indicates status information for the systems, such as an indication of the last time that a communication was received from a system (e.g., to track whether a system continues to be available for new queue-related operations).

By maintaining such information about data storage systems used by the data queuing service, new data storage systems can easily be added for use with the data queuing service, and existing data storage systems can easily be removed when they fail or otherwise become unavailable. To incorporate such changes, available data storage systems to use for a queue operation may in at least some embodiments be dynamically selected at the time of at least some queue operations. In addition, by enabling the easy addition of new data storage systems, the data queuing service can easily scale to handle increasing queue-related workloads and/or to handle increasing sizes of queues. Moreover, the ability to easily remove and replace failed systems also allows low-cost commodity and/or failure-prone systems (e.g., systems providing less than "four nines" (99.99%) or "five nines" (99.999%) guaranteed uptime) to be used for data storage systems in at least some embodiments. In particular, when an existing data storage system fails in the illustrated embodiment (e.g., due to a hard disk crash or failure of other hardware that prevents a system from rebooting, software bugs that cause a system to hang or reboot, failure of a network connection to the data storage system, permanent destruction of a data center, etc.), another new data storage system may be used to replace the failed system for new queue operations, but the stored queue elements on the failed system are not replicated on the new replacement data storage system—in other embodiments, such stored queue elements on a failed system may instead be replicated on a new replacement data storage system (e.g., based on information from one or more mirror systems for the failed system). In addition, in some embodiments the determination of mirroring relationships between systems may be re-evaluated after any change to the current data storage systems, such as based on a deterministic algorithm to select mirror systems. Furthermore, in some embodiments the data queuing service (or the merchant or other entity providing the service) may guarantee levels of service or reliability to customers based on an estimated probability of failures of data storage systems, such as the likelihood of losing an enqueued data element due to all storage systems that have a stored copy of the data element becoming unavailable before the element is dequeued.

FIG. 2C also illustrates an example queue storage location database 220, which in the illustrated embodiment is used by the data queuing service to identify data storage systems that are available to use to satisfy a read operation on a queue. In particular, in this example embodiment the database 220 includes various entries 220a-220e that each correspond to a portion of a queue on a data storage system, with the database including information indicating identifiers of the queue and the data storage system, as well as an indications of whether the queue portion currently has any enqueued elements. Thus, upon a read request for a queue, the data queuing service can quickly identify which portions of the queue (if any) currently have enqueued data elements, and then select one of the identified queue portions for use in fulfilling the request. The database can easily be updated to reflect the current status of queue portions, such as by updating the database to indicate that a queue portion has at least one enqueued element upon enqueuing a data element to the queue portion, and by updating the database to indicate that a queue portion does not have any enqueued elements when a read request to the queue portion returns an indication that the last stored element has been returned or that no stored elements are available.

FIG. 2C also illustrates an example queue configuration database 230, which in the illustrated embodiment is used to store various queue-specific configuration information. In particular, in this example embodiment the database 230 includes various entries 230a-230b that each correspond to a queue, with the example database including information indicating the subscription associated with the queue, a read-lock timeout value for use with the queue, and information related to the degree to which the queue will be distributed over alternative data storage systems and the degree to which the alternative data storage systems will be replicated with mirror systems—in other embodiments, a variety of other types of configuration information may similarly be specified, and some of the illustrated types of configuration information may not be used.

In the illustrated embodiment, the read-lock timeout value is used when reading and dequeuing elements from queues. In particular, in order to ensure that queued data is successfully obtained by a consumer program, in the illustrated embodiment a consumer program first accesses an enqueued data element by requesting that the data element be read without having the element be removed from the queue. If the enqueued data element is successfully received by the consumer program, the program then requests that the element be dequeued from the queue, such as by indicating the queue element using a queue element identifier that was received by the program as part of the response to the prior read request. While this technique ensures that queued data is received by a consumer program, an issue occurs with a first queue element that has been read by one consumer program when another consumer program executes a read request before that first queue element has been dequeued— in particular, that same first queue element may be returned in response to the subsequent read request. In order to address this issue, in some embodiments an enqueued data element that has been read but not yet dequeued is placed in a locked state for a limited period of time (e.g., a time equal to the read-lock timeout value) such that any such locked enqueued data elements are not returned for any subsequent read requests, with the read-lock timeout value being configurable for each queue. In addition, in some embodiments a similar technique could be used to lock queue elements as they are being enqueued, such as to ensure that sufficient time exists to allow a queue element to be enqueued on or more mirror systems before it is read and/or dequeued (e.g., in situations in which queue elements are read very quickly, such as with a LIFO queue).

Figure 3:
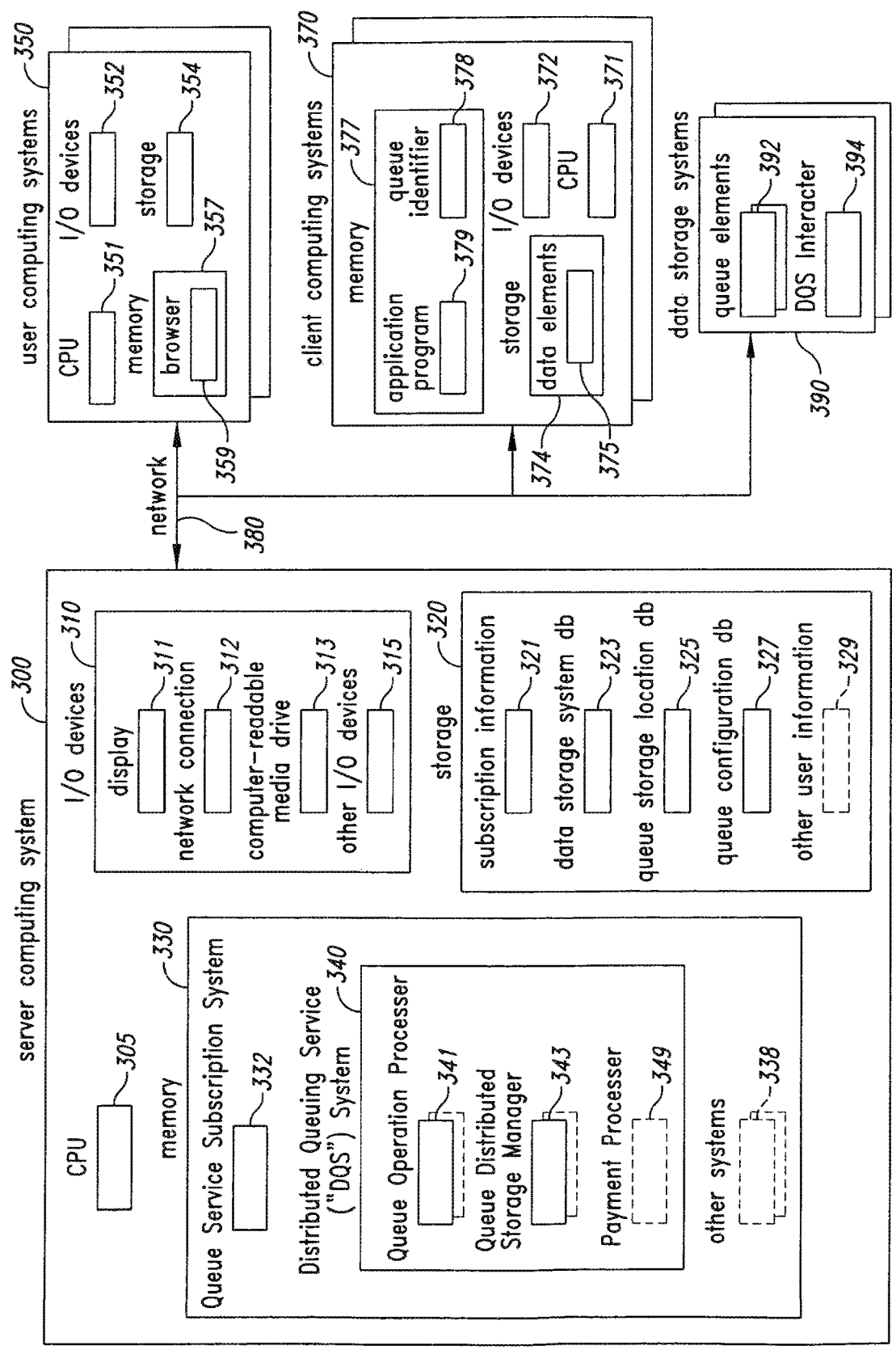
FIG. 3 is a block diagram illustrating a computing system suitable for executing an embodiment of a system for providing a reliable distributed queuing service.

FIG. 3 illustrates a server computing system 300 suitable for executing an embodiment of a Distributed Queuing Service ("DQS") system facility, with the computing system 300 including a CPU 305, various input/output ("I/O") devices 310, storage 320, and memory 330. The I/O devices include a display 311, a network connection 312, a computer-readable media drive 313, and other I/O devices 315. FIG. 3 also illustrates other computing and data storage systems that may interact with computing system 300 over a network 380, including computing systems 350 with which users may interactively perform queue-related operations (e.g., to create subscriptions and associated queues), computing systems 370 on which executing application programs may programmatically interact with the DQS system to access queue-related functionality, and data storage systems 390 that store queue elements in a distributed manner.

In the illustrated embodiment, an example Queue Service Subscription system 332 is executing in memory 330 in order to provide subscription-related services to users, such as users of user computing system 350 over network 380. For example, one of the users may use a browser 359 executing in memory 357 of a user computing system to interact with the Queue Service Subscription system in creating and providing information about a subscription of the user, including to create and/or associate one or more queues with a subscription. However, while queues are associated with subscriptions of users in the illustrated embodiment, in other embodiments queues need not be associated with such subscriptions (e.g., if no payment or usage restrictions are to be used with the queues) or such subscriptions may not be present at all. In the illustrated embodiment, the Queue Service Subscription system stores received subscription information in a subscription information database 321 on storage 320, and may further store additional received user-related information (if any) in an optional other user information database 329. For example, in some embodiments the Queue Service Subscription system may be provided by or on behalf of a merchant, and the users of the user computing systems may be customers of that merchant—if so, various customer-related information about users that is not specific to customer subscriptions may be obtained and stored for later use in transactions with the merchant. Various types of information can also be specified for queues, such as to configure their operation, and if so the Queue Service Subscription system stores the received queue configuration information in a queue configuration database 327 on storage 320. For example, configuration information may include details about access controls (e.g., to limit some or all queue-related operations to specified users), queue operation information (e.g., how long to lock a queue element that is read, such as 60 seconds; how long to maintain queued elements that have not been dequeued, such as 30 days; how large or how many or what type of data may be stored in a queue, such as a maximum of four thousand queue elements that may each contain four kilobytes of any type of UTF-8 encoded XML, data; etc.).

An example embodiment of DQS system 340 is also executing in memory 330 to provide queue-related services to executing programs. In particular, in the illustrated embodiment an application program 379 is executing in memory 377 of each of one or more client computing systems 370, and those application programs may interact with the DQS system to obtain distributed queue services. In the illustrated embodiment, a client computing system may have one or more data elements 375 on storage 374, and may wish to store those data elements in a queue for its own later use and/or for later use by other application programs. In order to enqueue such data elements, the application program sends a corresponding request to the DQS system to add one or more of the data elements to a specified queue, such as by providing a unique queue identifier 378 for a queue that was previously created (e.g., by a user of one of the user computing systems with whom the application program is associated) and included as part of the application program or provided in a manner otherwise accessible to the application program. The request may be sent to the DQS system by, for example, invoking an API (not shown) provided by the DQS system, such as an API based on Web services. In some embodiments, the request may further include an indication of an associated subscription and/or of a user on whose behalf the enqueue request is made, such as to allow the DQS system to determine whether the request is allowed for the queue based on usage restrictions and/or access controls.

When the DQS system receives an enqueue request and associated data element(s), the system forwards the request and associated data to a Queue Operation Processer component 341 for processing. In some embodiments, multiple such components may be simultaneously executing (e.g., for load balancing and/or scalability reasons), whether as part of a single computing system or on multiple systems, and if so the request and data may be forwarded to any of the components for handling in the illustrated embodiment. After a component 341 receives the data enqueue request, it obtains information from a data storage system database (or "db") 323 on storage 320 to identify a group of one or more alternative data storage systems 390 that are associated with the queue and available for storing the data element(s), such as based on a dynamically executed algorithm (e.g., a consistent hashing algorithm). The component 341 then selects one of those identified data storage systems (e.g., at random), and sends the data enqueue request to that data storage system. In some embodiments, the component 341 may further identify one or more mirror data storage systems for the selected alternative data storage system (e.g., from the database 323), and if so sends the data enqueue request to each of those mirror data storage systems as well. After receiving an indication of success for the enqueue operation, which in the illustrated embodiment is based on success of at least one of the selected alternative data storage system and mirror systems in performing the enqueue operation, the component 341 provides a corresponding response to the application program that sent the enqueue request.

In a similar manner, when an application program 379 desires to obtain one or more enqueued data elements, whether the same program that performed the enqueuing or a distinct program, the program sends a request to the DQS system to obtain one or more of the enqueued data elements. In particular, as discussed in greater detail elsewhere, in the illustrated embodiment the application program will first request to read the data element(s), and after the read is successfully performed, will request to remove the data element(s) using a dequeue operation. When the DQS system receives a read or dequeue request, it forwards the request to the Queue Operation Processer component 341. For a read request, the component 341 identifies one or more data storage systems that store at least one queue element for the queue (e.g., by using a queue storage location database, as discussed below), and selects one of those identified data storage systems (e.g., at random). For a dequeue request of a specified enqueued data element, the component 341 instead selects the data storage system that stores that data element, such as based at least in part on information in the dequeue request that identifies that data element and/or system. After selecting a data storage system for a read or dequeue operation, the component 341 then sends the request to that data storage system, as well as to mirror data storage system(s) (if any) for the selected data storage system. After receiving an indication of success for the operation, which in the illustrated embodiment is based on success of at least one of the selected data storage system and mirror systems in performing the operation, the component 341 provides a corresponding response to the application program that sent the request, including any retrieved queue element(s) for a read request.

In order to assist in the identification of an appropriate data storage system that stores queued data elements for a queue identified in a read request, the component 341 uses a queue storage location database 325 in the illustrated embodiment. In particular, when the component 341 enqueues a data element on a queue, it stores an indication in the queue storage location database that the data storage system has at least one stored data element for that queue. If an attempted read of a queue element for a queue on the data storage system later indicates that no data elements are currently stored, the component 341 updates the queued storage location database to reflect that the data storage system does not store any data elements for the queue.

In addition, each of the data storage systems will occasionally (e.g., every few seconds) send status messages to the DQS system in the illustrated embodiment to indicate that they are still functioning and accessible, such as if the data storage system is able to execute a dummy query on a database used to store queue elements—in some embodiments, the status messages may simply be a "heartbeat" message indicating that the data storage system is alive with little or no additional substantive data about the system. Thus, if the DQS system, and in particular a Queue Distributed Storage Manager component 343 of the system, does not have any interactions with a data storage system for a sufficiently long period of time (e.g., does not receive 3 consecutive heartbeat messages, or instead has two requested operations to the system timeout without a response), the component will update the data storage system database and queue storage location database to indicate that the data storage system is not currently available and does not store any data elements for any queues (e.g., by removing entries corresponding to that data storage system). New data storage systems similarly interact with the component 343 to provide information about their availability, which is stored in the data storage system along with indications of one or more mirror systems for the data storage system. In some embodiments, the component 343 will determine appropriate mirror systems for each of the available data storage systems, such as after each occurrence of adding a new data storage system or of removing an existing data storage system that is no longer available.

When a DQS Interacter component 394 at a data storage system receives an enqueue request from the DQS system, it attempts to store the data element(s) as queue elements 392 in a manner associated with the indicated queue. The data storage system then provides an indication of success or failure to the DQS system. Similarly, when a DQS Interacter component at a data storage system receives a read request from the DQS system, it attempts to retrieve stored data element(s) from the queue, and if successful returns the retrieved queue elements to the DQS system for forwarding to the application program that made the read request. In addition, when a DQS Interacter component at a data storage system receives a dequeue request from the DQS system, it attempts to remove the specified data element(s) from the indicated queue, and then provides an indication of success or failure to the DQS system. Other queue-related operations will similarly be handled in appropriate manners by the DQS Interacter components for the data storage systems.

In the illustrated embodiment, an optional Payment Processer component 349 is also executing as part of the DQS system, such as to obtain payments as appropriate for queue-related operations in embodiments in which fees are charged by the DQS system (e.g., by using payment source information associated with queues, with subscriptions associated with the queues, and/or with one or more users associated with the queues). Similarly, one or more other systems 338 may also be executing in memory 330 (e.g., a monitoring program to track queue and/or data storage system usage), and if so may interact with the DQS system and/or the information stored on the storage 320 as appropriate.

Those skilled in the art will appreciate that computing and data storage systems 300, 350, 370 and 390 are merely illustrative and are not intended to limit the scope of the present invention. Computing system 300 may be connected to other devices that are not illustrated, including through one or more networks such as the Internet or via the World Wide Web ("Web"). More generally, a "client" or "server" computing system or data storage system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components and/or modules may execute in memory on another device and communicate with the illustrated computing system/device via inter-computer communication. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
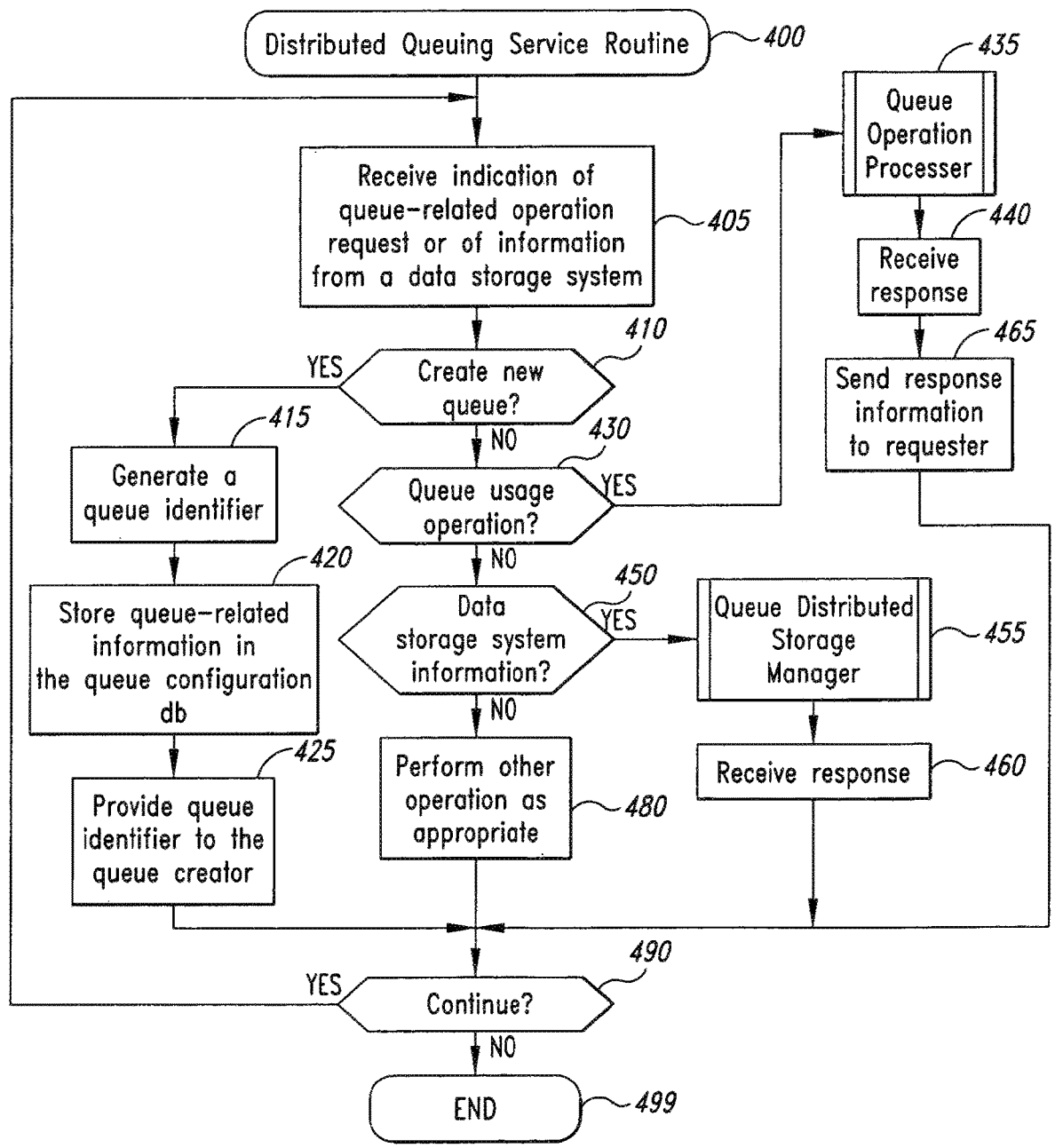
FIG. 4 is a flow diagram of an embodiment of the Distributed Queue Service routine.

FIG. 4 is a flow diagram of an embodiment of a Distributed Queuing Service routine 400. Such a routine may be executed, for example, in or by DQS System 340 in the illustrated embodiment of FIG. 3. The routine receives requests and information related to the operation of distributed queues, and responds in an appropriate manner to provide queue-related functionality.

The routine begins at step 405, where an indication is received of a request for a queue-related operation or information related to one of the distributed data storage systems. In some embodiments, queue-related operation requests may be received via an API provided to external entities, such as a Web services-based API invoked by executing application programs of customers of the distributed queuing services. Similarly, in some embodiments interactions with data storage systems and/or other executing programs (e.g., a subscription service for a merchant who is providing the distributed queuing service) may similarly occur via a provided API, such as a Web services-based API.

In the illustrated embodiment, the routine continues to step 410 to determine whether the indication received in step 405 was to create a new queue, such as a request from a customer's application program or from a subscription service. If so, the routine continues to step 415 to generate a unique identifier for the new queue, and in step 420 stores the queue identifier and other received information related to the queue (e.g., configuration information such as access controls related to use of the queue and/or other usage restrictions, a subscription identifier associated with the queue, information about operating parameters for the queue, an expiration date or other effective times for the queue, etc.). While not illustrated here, in other embodiments additional types of functionality may be provided, such as to verify that the requester is authorized to create the queue and/or to obtain any associated payment for the queue creation before proceeding. Similarly, in some embodiments an initial group of one or more data storage systems to store the data element of the queue could be identified for use with subsequent queue usage operations and stored for later retrieval, although in the illustrated embodiment the selection of a group of appropriate alternative data storage systems for a queue is performed dynamically at the time of at least some queue usage operations. After step 420, the routine continues to step 425 to provide an indication of the generated queue identifier to the requester for later use with the queue.

If it is instead determined in step 410 that the received indication in step 405 was not a request to create a queue, the routine continues to step 430 to determine whether the indication is a request for a queue usage operation, such as to enqueue, read or dequeue one or more data elements. If so, the routine continues to execute subroutine 435 to process the requested queue usage operation, and in step 440 receives a response for the operation (e.g., one or more retrieved queue data elements for a read operation, or an indication of success or failure for an enqueue or dequeue operation). After step 440, the routine continues to step 465 to send the response information to the requester. If it was instead determined in step 430 that the received indication in step 405 was not a request for a queue usage operation, the routine continues to step 450 to determine whether the received indication is information from or related to a data storage system. If so, the routine continues to execute subroutine 455 to process the received information in an appropriate manner, and in step 460 receives a response related to the handling of the message.

If it was instead determined in step 450 that the indication received in step 405 was not information related to a data storage system, the routine continues instead to step 480 to perform another indicated action if appropriate. For example, in some embodiments other actions may involve other types of requests related to queues (e.g., to change configuration information, to delete a queue, etc.), and if so the requested action will be performed if appropriate (e.g., if the requester is authorized to perform the action). Alternatively, the indicated action may be related to monitoring the operation of the distributed queuing service or to perform various administrative modifications with respect to the distributed queuing service. After steps 425, 460, 465 or 480, the routine continues to step 490 to determine whether to continue. If so, the routine returns to step 405, and if not the routine continues to step 499 and ends.

Figure 5A:
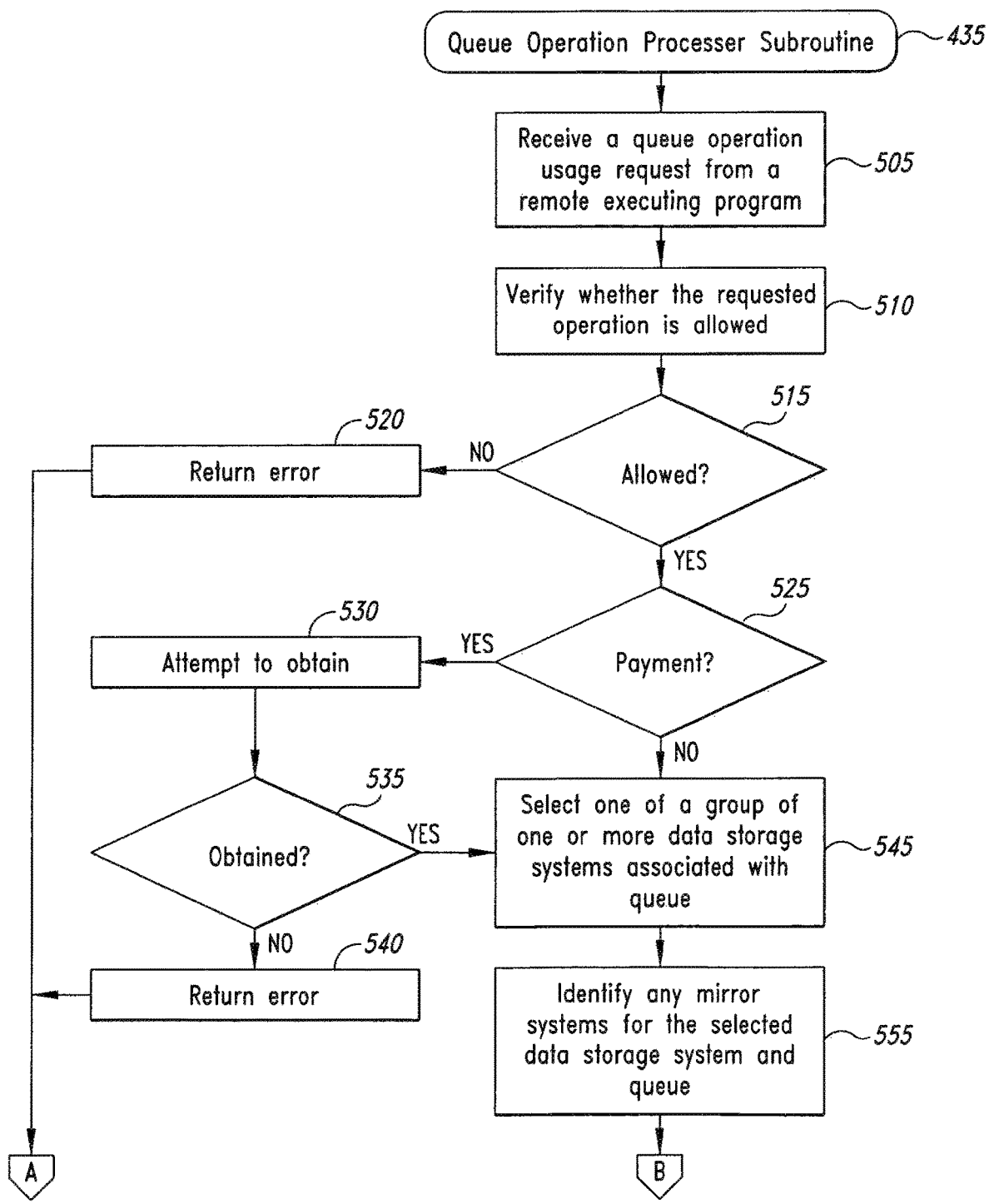
FIG. 5 (labeled "5A" and "5B") is a flow diagram of an embodiment of the Queue Operation Processer subroutine.
Figure 5B:
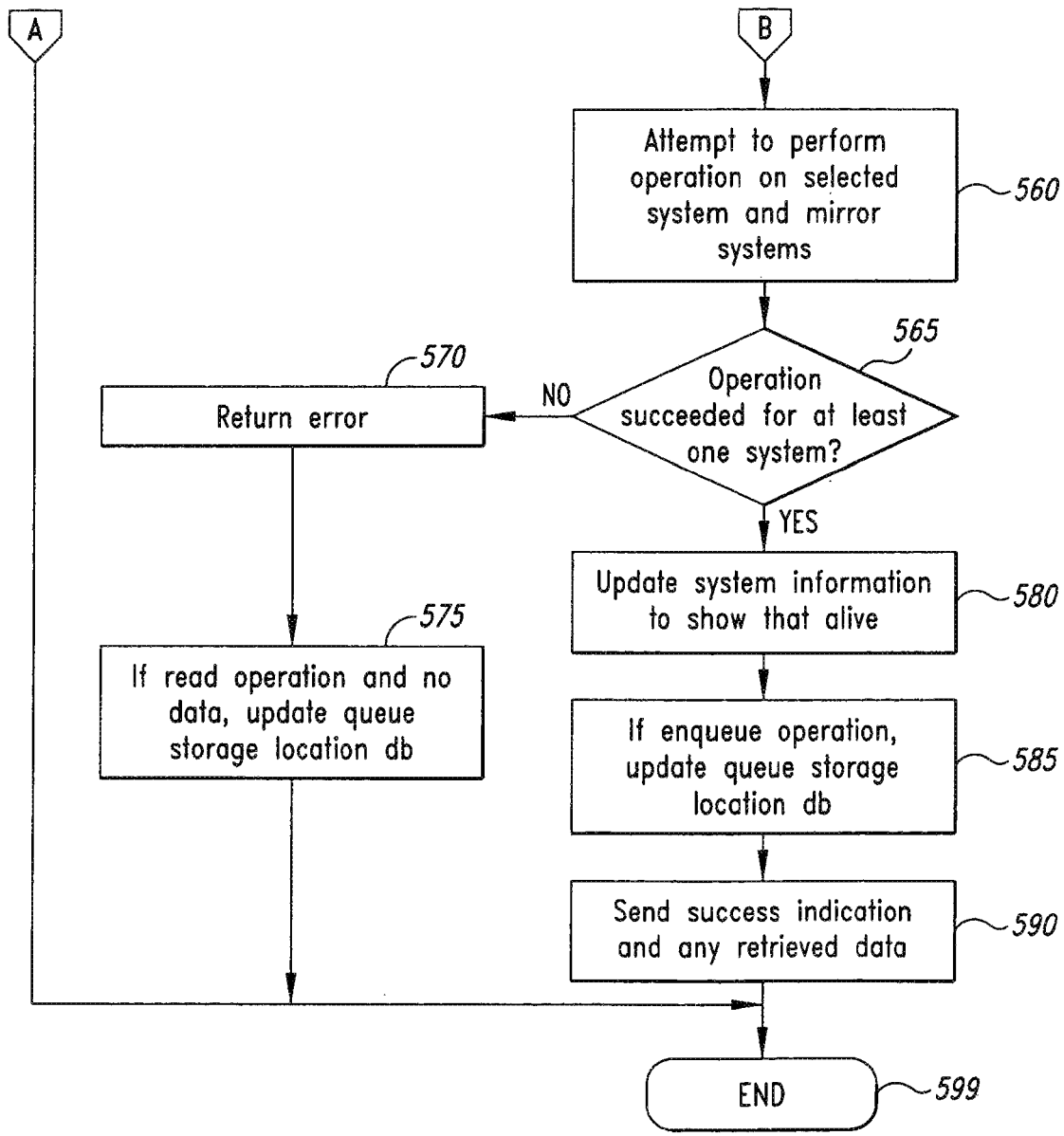

FIG. 5 is a flow diagram of an embodiment of a Queue Operation Processor subroutine 435. Such a subroutine may be executed, for example, in or by the Queue Operation Processer component 341 in the illustrated embodiment of FIG. 3. The subroutine receives a request to perform a usage operation for a specified queue, and performs the operation if possible.

The subroutine begins at step 505, where an indication is received of a queue usage operation requested by a remote executing program.—In some embodiments, each queue usage operation request may include an indication of the queue identifier for the queue, a subscription ID associated with the queue, a user identifier associated with the requester, an indication of the type of queue usage operation, and optionally data associated with the queue usage operation (e.g., one or more data elements to be added to the queue for an enqueue operation). The subroutine next continues to step 510 to verify whether the requested queue usage operation is permitted for the queue and requester, such as based on configuration information associated with the queue. If it is determined in step 515 that the queue usage operation is not allowed, the subroutine continues to step 520 to return a corresponding error message to the requester. However, if it was instead determined in step 515 that the queue usage operation is allowed, or if such a check is not performed in other embodiments, the subroutine continues to step 525 to determine whether any payment is associated with performance of the queue usage operation (e.g., to charge per-operation fees for enqueue and/or read operations). If so, the subroutine continues to step 530 to attempt to obtain the payment (e.g., based on the subscription associated with the queue and/or from the operation requester, such as in an interactive manner). If it is determined in step 535 that the payment was not obtained, the subroutine continues to step 540 to return a corresponding error message.

If it was instead determined in step 525 that no payment was needed, or in step 535 that any needed payment was obtained, or alternatively if payments are instead not used in other embodiments, the subroutine continues to step 545 to select a data storage system associated with the queue for use in performing the requested queue operation. In some embodiments and situations, a group of multiple alternative data storage systems may be identified for the queue, and if so one of those systems can be selected in a variety of ways. For example, in situations in which the data storage systems associated with a queue will change rarely or not at all, indications of the associated data storage systems for a queue may be initially assigned and then later used for enqueue, read and/or dequeue operations. However, in the illustrated embodiment the data storage systems associated with a queue are dynamically determined for enqueue operations at the time of the operation, and the associated data storage systems for a read operation are identified based on a dynamic determination of the data storage systems that currently store at least one data element for the queue. In particular, in the illustrated embodiment the associated data storage systems for a queue are identified based on the use of a consistent hashing algorithm that selects one of the currently available data storage systems. If the current queue is to be distributed across a group of multiple alternative data storage systems, such as based on the configuration information for the queue and/or in a dynamic manner based on current conditions (e.g., the load one some or all of the data storage systems), the additional data storage systems are identified in the illustrated embodiment by using other data storage systems that consecutively follow the initial matching data storage system based on some consecutive ordering technique for the data storage system (e.g., based on network addresses). If multiple alternative data storage systems are identified, whether for an enqueue or read operation, one of those data storage systems can be selected for use with the operation in various ways, such as randomly, based on distributing the load across all of the data storage systems as equally as possible, etc.

After step 545, the subroutine continues to step 555 to identify any mirror data storage systems for the selected data storage system.—In the illustrated embodiment, mirror systems are associated with data storage systems in a manner independent of the queues stored on the data storage systems, but in other embodiments a data storage system may have distinct mirror systems for distinct queues stored on the data storage system, or more generally mirroring could be performed on a per-queue element basis. After step 555, the subroutine in step 560 attempts to perform the requested queue usage operation on the selected data storage system and any identified mirror data storage systems, such as by sending appropriate request messages to those data storage systems.

In step 565, the subroutine then determines whether the attempted operation succeeded on at least one of those data storage systems, such as based on responses received from those systems. If none of the attempted operations succeeded, the subroutine continues to step 570 to return an indication that the operation did not succeed. In addition, if the usage operation was to read a data element but the selected data storage system and its mirror systems are not currently storing any data elements for the queue, information about the selected data storage system is updated in step 575 to reflect that no data elements are currently stored for the queue on that data storage system. In other embodiments, if a read operation failed in this manner, the subroutine may instead attempt to select a different one of the associated data storage systems for the queue that is believed to currently store one or more data elements for the queue, and to return to step 555 for additional processing. While not illustrated here, in other embodiments the subroutine could further determine if responses were received from any of the systems that indicate that the systems are functioning properly, and if so the subroutine could update information for each of those systems to reflect that they are currently functioning (e.g., to assist in later identification of systems that have failed or are otherwise inaccessible due to a lack of communication with those systems for a sufficiently long period of time)

If it was instead determined in step 565 that the requested usage operation did succeed for at least one of the selected and mirrored data storage systems, the subroutine continues to step 580 to update information for each of the systems on which the operation succeeded in order to reflect that the system is currently functioning. After step 580, the subroutine continues to step 585 to determine if the usage operation was to enqueue one or more data elements, and if so information for the systems on which the operation succeeded are updated to reflect that they currently store at least one data element for the queue (e.g., to allow them to be identified as an appropriate data storage system for a later read usage operation). In step 590, the subroutine then returns a message to the requester indicating success, including any associated data for the operation, such as one or more queue data elements that are retrieved in response to a read operation. After steps 520, 540, 575 or 590, the subroutine continues to step 599 and ends.

Figure 6:
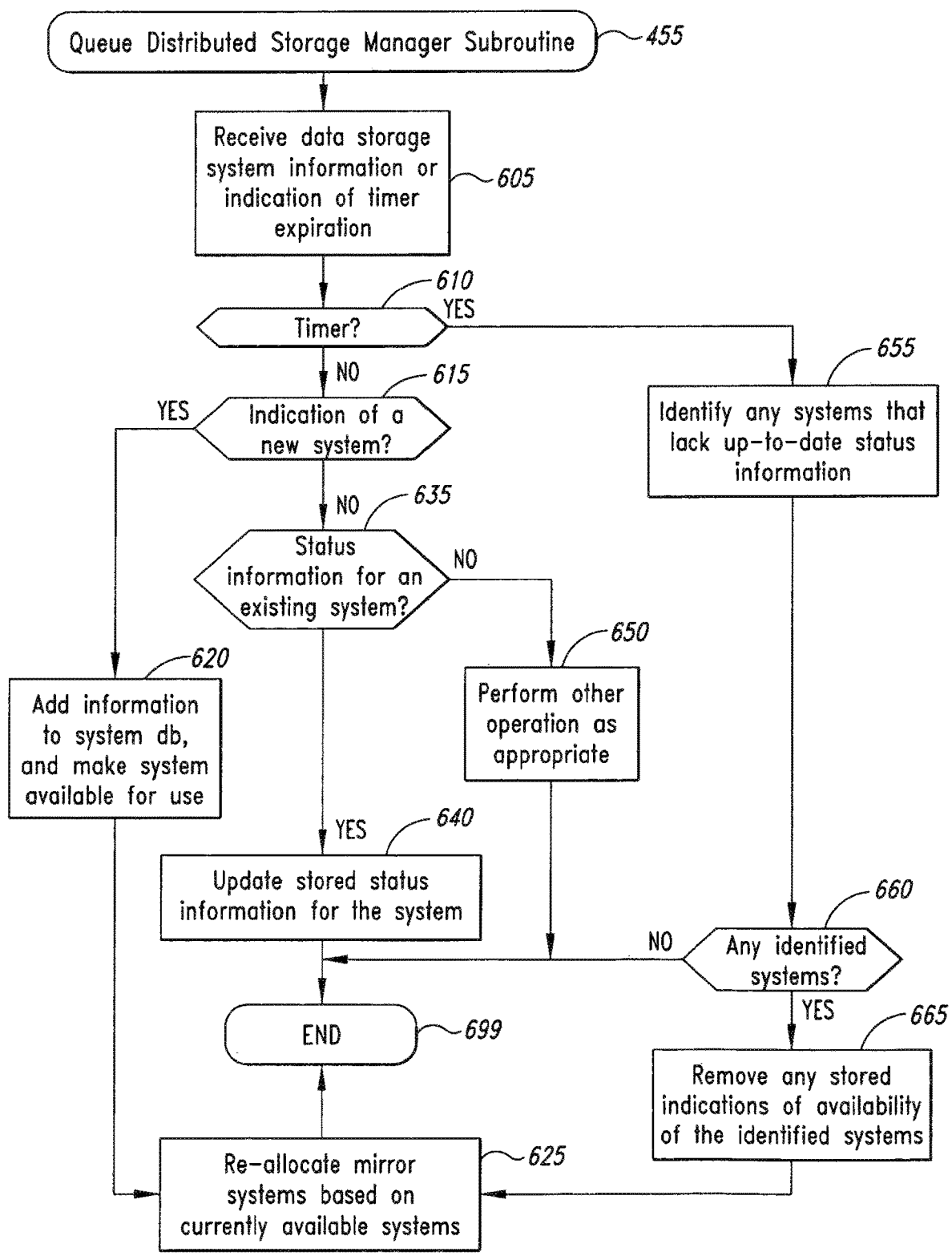
FIG. 6 is a flow diagram of an embodiment of the Queue Distributed Storage Manager subroutine.

FIG. 6 is a flow diagram of an embodiment of a Queue Distributed Storage Manager subroutine 455. Such a subroutine may be executed, for example, in or by the Queue Distributed Storage Manager component 343 in the illustrated embodiment of FIG. 3. The subroutine receives information regarding distributed data storage systems, and uses the received information to maintain information about the data storage systems that are available for use with the queuing service.

The subroutine begins at step 605, where an indication is received of information from or related to a data storage system or instead that a timer has expired—such a timer may be repeatedly set to provide polling functionality for the subroutine, such as to trigger a check of the current availability of data storage systems that have previously been in use. If it is determined in step 610 that a timer expiration has not occurred, the subroutine continues to step 615 to determine if the indicated message reflects that a new data storage system has become available. If so, the subroutine continues to step 620 to store information about the new data storage system so that the data storage system will be available for future use to store queue information. The subroutine then continues to step 625 to identify one or more mirroring data storage systems for the new data storage system and to store that information with the information about the new data storage system.

If it was instead determined in step 615 that an indication of a new data storage system was not received, the subroutine continues instead to step 635 to determine whether current status information was received from a data storage system. If so, the subroutine continues to step 640 to update information for that data storage system to indicate that the data storage system is available as of the time of the message. If it was instead determined in step 635 that information was received that was not a status message, the subroutine continues instead to step 650 to perform another indicated operation if appropriate, such as to update configuration and/or other information for a data storage system that is already in use by the distributed queuing service.

If it was instead determined in step 610 that a timer expiration did occur, the subroutine continues to step 655 to determine whether any data storage systems currently in use have become unavailable, such as based on not having received a status message from the data storage system for a specified period of time and/or having a specified number of attempted operations for that data storage system fail. The subroutine then continues to step 660 to determine if any systems were identified, and if so continues to step 665 to update stored information used by the data queuing service to remove any stored indications that the data storage system is available for storing new queue data elements and that the data storage system currently stores any queue data elements. The subroutine then further continues to step 625 to reallocate which data storage systems are mirrors for other data storage systems, so that each data storage system has an appropriate number of mirror systems. After steps 625, 640, 650, or 660, the subroutine continues to step 699 and ends.

Figure 7A:
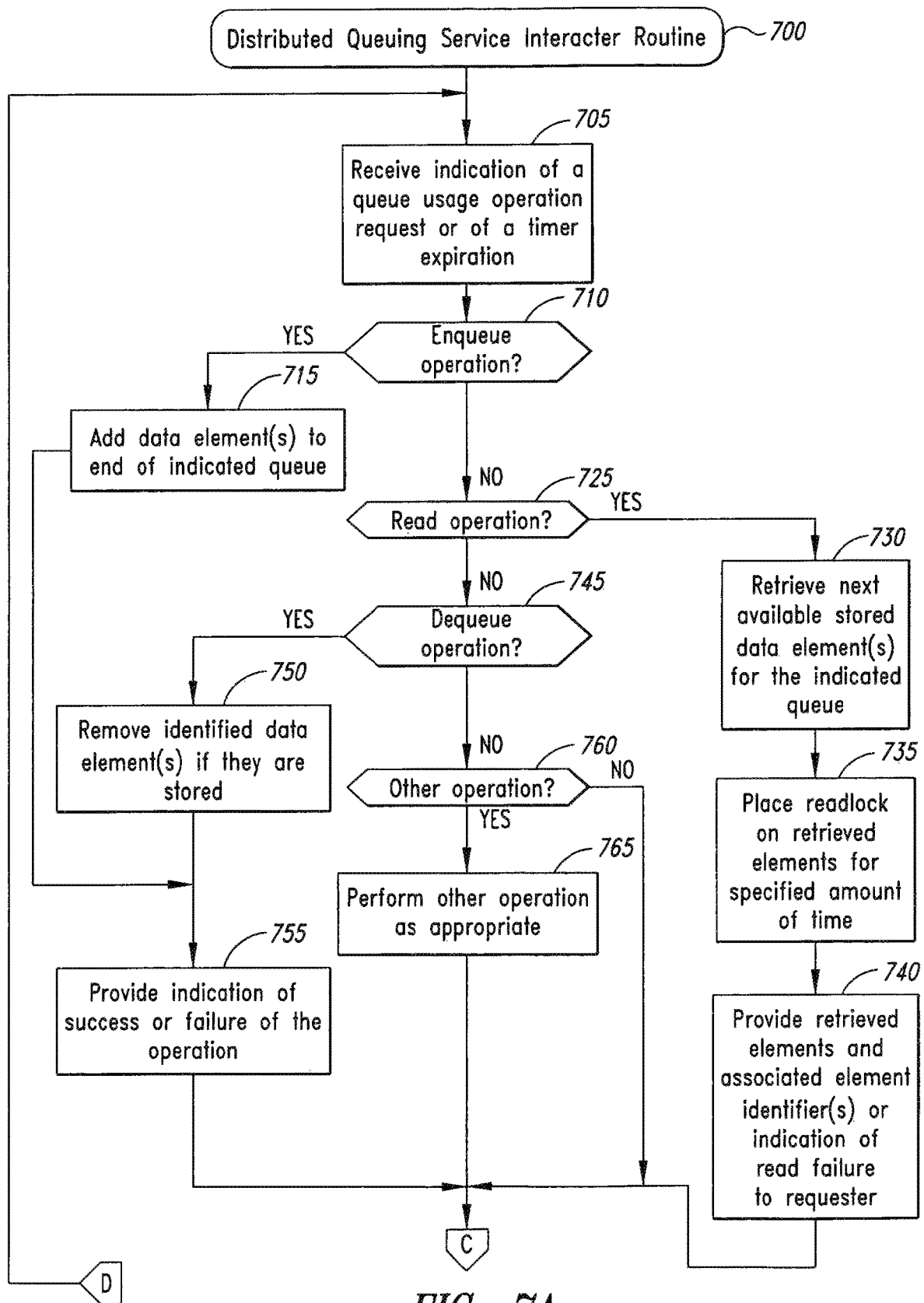
FIG. 7 (labeled "7A" and "7B") is a flow diagram of an embodiment of the Distributed Queue Service Interacter routine.
Figure 7B:
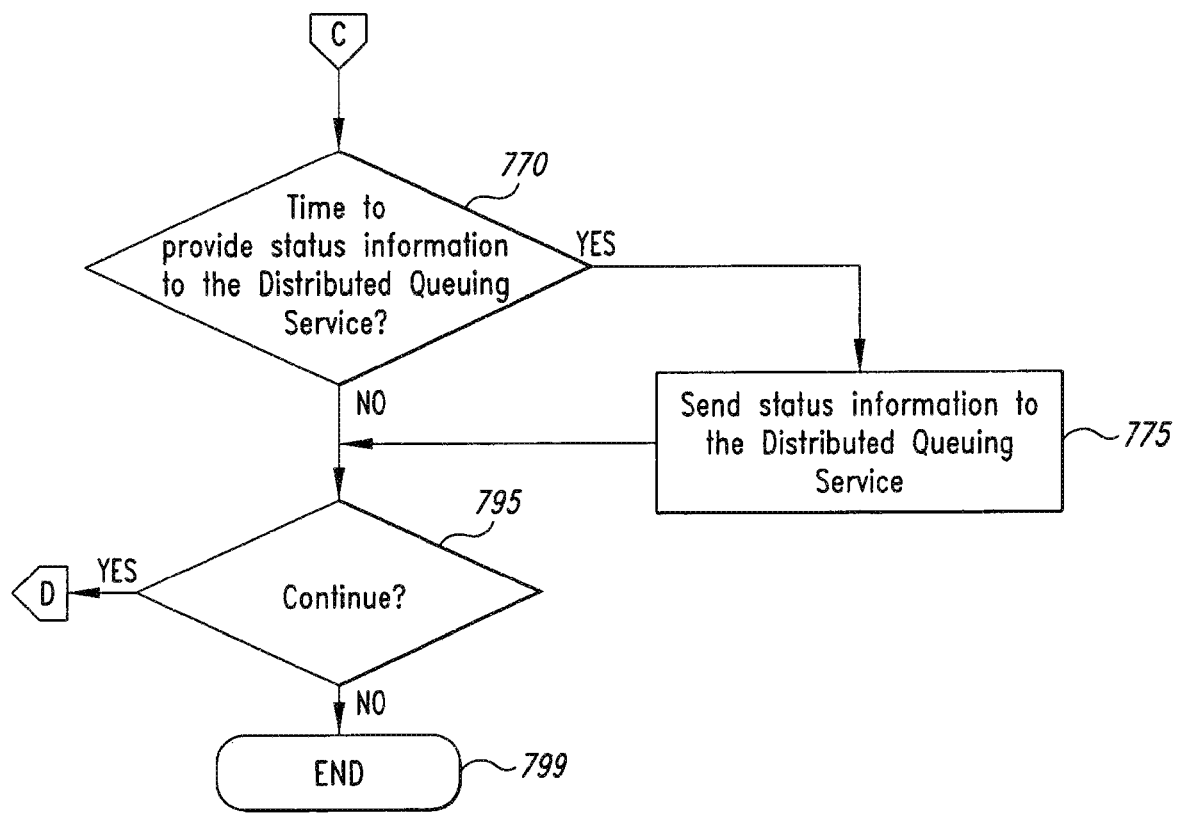

FIG. 7 is a flow diagram of a Distributed Queuing Service Interacter routine 700 for a data storage system. Such a routine may be executed, for example, in or by the DQS Interacter 394 in the illustrated embodiment of FIG. 3. The routine receives requests related to storing and retrieving queue data elements and performs them as appropriate, as well as providing periodic status information to the queuing service.

The routine begins in step 705, where an indication is received of a queue usage operation request or that a timer has expired—such a timer may be repeatedly set to provide polling functionality for the routine, such as to ensure that the data storage system repeatedly provides status information to the DQS system in a timely manner. The routine continues to step 710 to determine whether an enqueue request was received, and if so continues to step 715 to add the one or more data elements included with the request to storage in a manner associated with the identified queue for the request, with the storage performed in such a way as to place the new data elements at the end of the queue (e.g., by storing them with a timestamp to facilitate later time-based sorting).

If it was instead determined in step 710 that the received request was not for an enqueue operation, the routine continues to step 725 to determine whether the request was for a read operation. If so, the routine continues to step 730 to retrieve one or more of the next available stored data elements for the specified queue, and in step 735 places a read-lock on those storage data elements for a specified period of time such that they will not be treated as being available for subsequent read requests during that period of time. In step 740, if the operation was successful, the routine then provides to the requester the retrieved queue data elements and any identifiers associated with the data elements, and otherwise provides an indication that the operation did not succeed (e.g., by indicating that no queue elements are currently stored, that a read request to an underlying database failed, by failing to provide any response within a specified period of time, etc.).

If it was instead determined in step 725 that the received request was not for a read operation, the routine continues instead to step 745 to determine whether the received request was for a dequeue operation. If so, the routine continues to step 750 to remove the one or more identified queue data elements if they are present in storage. After steps 715 or 750, the routine then continues to step 755 to provide an indication to the requester of whether the operation succeeded. If it was instead determined in step 745 that the received request was not for a dequeue operation, the routine continues instead to step 760 to determine whether another type of requested operation was received. If so, the routine continues to step 765 to perform the requested operation if appropriate.

After steps 740, 755, or 765, or if it was instead determined in step 760 that a request was not received and that a timeout has instead occurred, the routine continues to step 770 to determine whether it is time to provide status information to the queuing service. If so, the routine continues to step 775 to send a status information message to the service to provide an indication that the data storage system is available and operating. After step 775, or if it was instead determined in step 770 not to send a status message, the routine continues to step 795 to determine whether to continue. If so, the routine returns to step 705, and if not continues to step 799 and ends.

As previously noted, in some embodiments fees may be charged in certain circumstances, such as on a per-queue operation basis. While such fees may be fixed or pre-specified in some embodiments, in other embodiments such fees may be determined in other manners, such as based on network congestion, current storage levels, an amount of resources required to satisfy the request, etc. In addition, the fees may be charged to various parties in some embodiments, such as a user that originally created the queue (e.g., based on a subscription of the user that is associated with the queue), a non-creator requester on whose behalf of a queue operation request is received (e.g., an end-user of an application program provided by the user who created the queue), etc.

In addition, as previously noted, in some embodiments any type and amount of data may be stored in a queue element and/or in the aggregate for a queue, while in other embodiments only specified types of data and/or specified amounts of data may be stored in a particular queue element. In embodiments in which storage restrictions are imposed, various additional techniques may be provided to allow users additional capabilities. For example, in some embodiments an additional temporary storage facility may be made available to users (e.g., for a fee for some or all storage-related interactions and/or by providing a Web services-based API to users), whether by the same entity providing the data queuing service or an unrelated third party. If so, a user may be directed and/or instructed to store at least some types of data in the other storage facility, and to then store information in a queue data element to indicate how to access that other stored information (e.g., a pointer or identifier for the other stored data, an executable program or script, access information, etc.).

In addition, in some embodiments a variety of types of additional functionality that may be used by the data queuing service and/or provided to users of the queuing service. For example, in some embodiments various types of processing could be provided for information stored in queue elements, such as to perform virus checking, content analysis and/or filtering, data conversion (e.g., language translation for textual information, encryption and/or decryption services, etc.). Furthermore, in some embodiments additional capabilities may be provided to and/or suggested to users regarding use of the queues, such as techniques for encrypting data before it is provided to the data queuing service to prevent anyone (including the data queuing service) from accessing enqueued data and for correspondingly decrypting dequeued information.

The following describes additional details regarding specific example embodiments of the data queuing service, which are provided for illustrative purposes, and are not intended to limit the scope of the invention.

One example of how a customer might use the data queuing service involves communication between loosely coupled, sporadically connected clients. In particular, the data queuing service can be used to enhance a distributed sales-force application that is used for generating and following up on sales leads. In this example, a software company sends its sales force out to trade shows all over the country in order to stir up business, with the salespeople being given the task of generating leads by working the trade show floor and entering information related to every lead on a potential client into an application running on their PDA. The PDA has very limited local storage, so upon inputting a lead, it immediately connects to the Internet and enqueues the contact information as a queue data element using the data queuing service.

To follow-up on these generated leads, the company uses another group of sales people that work from home on a casual basis. When a sales person desires to do some work, he/she uses the sales-force application to contact the data queuing service and read an enqueued lead to be followed-up on. Once the lead is followed up on, the sales person uses the application to dequeue the queue element that contained the lead information. Since a queued element that is read but not yet dequeued will not be returned by subsequent reads while it is locked, a lead retrieved by a salesperson will be visible only to him/her until the element is dequeued or the lock expires.

Another example of how a customer might use the data queuing service involves the use of queues to support reliable transaction processing systems. In particular, the data queuing service can be used to enhance an order acceptance system for an online retailer that accepts orders from customers over the Internet. This retailer in this example wants to be able to accept orders unconditionally, regardless of whether their computer systems fail, a natural disaster strikes, or even if the order processing software crashes.

In this example, customers use the retailer's website or a desktop client-application to place their orders. The orders are sent into a queue provided by the data queuing service rather than directly to the retailer, because the highly reliable data queuing service allows operations to succeed even if the retailer's servers are down. The retailer's server-side order processing software then reads from the queue to retrieve enqueued orders, which are processed by the retailer's in-house servers. The orders remain in the queue until an order has shipped, thus preventing order loss even if the order processing software crashes while processing an order.

As another example of how a customer might use the data queuing service, consider a customer who uses a system to process financial transactions (e.g., payments for a merchant or a financial institution). In such situations, the customer may temporarily enqueue payment-related transaction requests, and then dequeue them in order to process them. This allows the transaction processing system to ensure that the transaction requests are reliably stored until they are executed, as well as to provide a buffer when particularly large numbers of transaction requests are received. Commonly-owned U.S. patent application Ser. No. 10/894,347, filed Jul. 19, 2004 and entitled "Automatic Authorization Of Programmatic Transactions," which is hereby incorporated by reference in its entirety, discusses one example of a transaction system that may use the data queuing service in this manner.

As previously noted, in at least some embodiments the group of alternative data storage systems to be used when enqueuing a new element in a queue is dynamically selected at the time of the enqueuing operation. As one example of such a dynamic selection process, the data queuing service uses a variation of consistent hashing to assist in balancing overall load. During this process, all data storage system identifiers are hashed onto a unit circle, and the queue identifier for the queue is similarly hashed onto the same circle. The next data storage system on the unit circle after the queue identifier is then selected as a first data storage system associated with the queue, and an additional K–1 data storage systems that occur on the unit circle in a clockwise direction after the initial data storage system will subsequently be selected as additional alternative data storage systems, where "K" reflects a degree of distributedness of the queue. A K value for a queue can be selected in a variety of ways, including by adjusting K dynamically for a queue based on the current load on the queue and/or based on other current conditions.

As one example of managing load, consider a situation in which the data queuing service supports up to 1 million queues that have an average of 1000 elements per queue, with the elements averaging 1 kilobyte. If 20 data storage systems are used that each have 100 gigabyte disks, the total data storage capacity will be 2 terabytes, which is twice the expected need capacity. If the data queuing service thus operates at 50% capacity, concerns about sufficient storage space are significantly minimized.

As previously noted, in at least some embodiments each data storage systems will have at least one mirror data storage system that replicates stored data queue elements. As one example of a process of selecting a mirror system, the following characteristics are employed: a mirror system should be in a different data center from the system being mirrored if at all possible; reciprocating mirror system relationships are preferred; having one system serve as a mirror for too many other systems should be avoided; and the process should be deterministic and very tolerant of data storage system failures. In particular, each system in one data center is attempted to be matched up with a system in an other data center that is at the same modulo position (with position determined by the sorted order of the system identifiers within the data center) to mirror each other. If the data centers have a different number of systems, one or more of the systems in the data center having the smaller number of systems may be allowed to serve as a mirror for multiple other systems in the data center having the larger number of systems. If there are too few systems available in the data center having the smaller number of systems, a maximum threshold will be reached, and mirror systems will begin to be chosen for the systems in the data center having the larger number of systems from that same data center, which is beneficial in the situation where a WAN connection between data centers is experiencing an outage.

The following provides examples of techniques for handling various types of failure situations. For a permanent hard disk crash, and assuming a non-RAID environment, the hard disk crash is equivalent to a hard server failure (when the server will not reboot) since the disk will not be replaced in this example embodiment. The system will naturally fall out of service (based on a failure to timely supply status information to the distributed queuing service), but every queue element stored in the failed system will have a replica copy in some other mirror system, and these copies will be dequeued in time. New replicas of the queue elements that were lost will not be made, although the risk of loss of a single copy increases with the time that the data is left in the queue.

For a temporary system failure that causes reboot, the server will temporarily be out of service, but will re-join the set of available systems by sending out a full refresh system status message after the system comes back in service again. There is a possibility that some of the queue elements in the system have already been dequeued from their mirror system(s), which is considered an acceptable consequence in the illustrated embodiment. Thus, no action will be taken to try to find out if queue element replicas have already been dequeued or not], and the duplicate queue elements will be served in the normal manner. Similar techniques will be used for a crash or a freeze of a database server process (or other data storage and retrieval program) and data queuing service process. In other embodiments, however, additional processing may be performed in such situations, such as to determine if queue element replicas have already been dequeued, and if so to prevent the serving of the duplicate queue elements to customer programs (e.g., by dequeuing those queue element replicas). Similarly, additional processing may be performed to determine if new queue elements were added to any mirror systems while the system was unavailable, and if so to replicate those new queue elements on the system.

For network isolation of one or more data centers, it will appear to each data center like the other data centers have disappeared. Accordingly, each data center will automatically re-allocate mirror systems for each of the systems in the data center by using other systems in the same data center. When the outage is over, there may be duplicate queue elements between data centers, since queue elements that were dequeued from one data center may not have been dequeued from the other data center. For permanent destruction of an entire data center, all data is still preserved based on mirror systems in other locations. Duplicates may be made in this situation of each of the mirror systems in order to repopulate a replacement data center.

The following provides an example of operations and APIs for at least some embodiments. In particular, the following table describes parameters for operation requests and their data types.

| Parameters | Type/Values |
|---|---|
| subscriptionId | Token identifying the subscription, which is allocated when the subscription is purchased and uniquely identifies an account associated with calls to the service. |
| queueName | A user-specified string that can be used to identify a queue within a particular subscription. |
| queueId | A globally unique string that can be used to identify a queue created by any subscription. |
| elementBodies | Vector of strings representing data to be enqueued. |
| readCount | An integer representing the size of a batch read request. |
| element | A pair of strings; both the element body itself and an identifier to be used for subsequent dequeuing of the element. |
| elements | A vector of elements. |
| elementIds | A vector of strings identifying previously-read elements. |
| queueInfo | A structure returned by ListMyQueues() that contains both the queue Id and its associated friendly name. |
| result | A boolean description of whether an operation succeeded or failed. |

The following provides examples of operation requests.

| Create | Create a new queue. | | |
|---|---|---|---|
| Queue | Parameter | Req/Opt | Description |
| Input | subscriptionId | Required | |
| | queueName | Optional | The user-defined name of the new queue |
| Output | result | | Success/Failure |
| | queueId | | A globally unique string identifying a queue, for use in subsequent queue operations |
| Error Conditions | Invalid queue name | | The specified queue name already exists or contains invalid characters. |

| | Retrieves a list of queues created by the caller's subscription. | | |
|---|---|---|---|
| ListMyQueues | Parameter | Req/Opt | Description |
| Input | subscriptionId | Required | |
| | queueNamePrefix | Optional | Return only queues whose name starts with queueNamePrefix |
| Output | result | | Success/Failure |
| | queueInfo[] | | An array of struct queueInfo describing each queue created under the caller's subscription. |
| Error Conditions | none | | |

| | Deletes an empty queue from the system. | | |
|---|---|---|---|
| DeleteQueue | Parameter | Req/Opt | Description |
| Input | subscriptionId | Required | |
| | queueId | Optional | Either the queueId or the queueName is used to specify the queue to be deleted |
| | queueName | Optional | |
| Output | result | | Success/Failure |
| Error Conditions | | | The call will fail if the specified queue is not empty. Read() and Dequeue() all data from the queue before deleting it. |

| ConfigureQueue | Parameter | Req/Opt | Description |
|---|---|---|---|
| | | | Modify properties of the specified queue |
| Input | subscriptionId | Required | |
| | queueId | Optional | Either the queueId or the |
| | queueName | Optional | queueName is used to specify the queue to be configured |
| | readLockedTimeout | Optional | The length of the time period during which elements that have been Read() but not Dequeued() will not be returned by subsequent calls to Read() (defaults to 60 seconds) |
| Output | result | | Success/Failure |
| Error Conditions | none | | |

| Enqueue | Parameter | Req/Opt | Description |
|---|---|---|---|
| | | | Insert a new element into a queue. |
| Input | subscriptionId | Required | |
| | queueId | Optional | Either the queueId or the queueName |
| | queueName | Optional | is used to specify the queue into which elements will be inserted |
| | elementBodies | Required | A vector of elements to insert |
| Output | result | | Success/Failure |
| Error Conditions | none | | |

| Read | Parameter | Req/Opt | Description |
|---|---|---|---|
| | | | Retrieve un-read elements from the specified queue. |
| Input | subscriptionId | Required | |
| | queueId | Optional | Either the queueId or the queueName |
| | queueName | Optional | is used to specify the queue to read from |
| | readCount | Optional | Specifies the number of elements to read from the queue. |
| Output | result | | Success/Failure |
| | elements | Required | A vector of elements from the queue. See remarks below. |
| Error Conditions | | | |
| Remarks | | | |

The Read() operation retrieves 'readCount' elements (or, the remaining elements in the queue if fewer than readCount) from the specified queue. The retrieved elements are returned in an array of type 'element'. An 'element' consists of an 'id' and a 'body.' The body is the data previously Enqueue()d by the client, and the id is a string used to identify the element in a subsequent call to Dequeue().

Read() does not delete elements from the queue, however an element returned by Read() will not be returned by a subsequent Read() call for the timeout period specified by the caller to CreateQueue() when the queue was created. This allows multiple consumer processes that concurrently read from a queue to automatically divide the elements among themselves, such as for distributed processing. However, even if a consumer Read()s an element just before crashing, the element will not be lost because it was Read() but not Dequeue()d. The 'lost' element will be returned by a future Read() call after the timeout elapses.

| Dequeue | Parameter | Req/Opt | Description |
|---|---|---|---|
| | | | Removes previously-read elements from the specified queue. |
| Input | subscriptionId | Required | |
| | queueId | Optional | |
| | queueName | Optional | Either the queueId or the queueName is used to specify the queue to read from |
| | elementIds | Required | Identifies the elements to dequeue |

-continued

Removes previously-read elements from the specified queue.

| Dequeue | Parameter | Req/Opt | Description |
|---|---|---|---|
| Output | result | | Success/Failure |
| Error | | | |
| Conditions | | | |
| Remarks | | | |

The Dequeue operation removes the (previously read) elements specified by elementIds from the specified queue. elementIds is an array of strings which come from the id member of the element structure returned by a previous call to Read().

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
   receiving, by one or more configured computing devices of an online message queue service and for a client of the online message queue service, a request to provide a message queue for use in storing data supplied for the client;
   creating, by the one or more configured computing devices, the message queue for the client, including selecting multiple clusters of message storage systems to use for the message queue from a plurality of clusters of message storage systems provided by the online message queue service; and
   providing, by the one or more configured computing devices, functionality of the message queue to the client, including:
   writing, on the multiple clusters and in response to one or more received message queue storage requests, messages for use by the client; and
   sending, in response to one or more received message queue retrieval requests, at least some of the stored messages for the client from the multiple clusters.

2. The computer-implemented method of claim 1, wherein the writing of the messages includes attempting to write on each of the multiple clusters, and wherein the method further comprises notifying the client of successful writing of the received message queue storage requests when at least one of the writes succeeds.

3. The computer-implemented method of claim 1, wherein the multiple clusters are alternative clusters for the created message queue that each stores a distinct subset of messages of the created message queue, and wherein the writing in response to the received message queue storage requests includes writing the distinct subset of messages on a selected single one of the clusters.

4. The computer-implemented method of claim 3, wherein the selected single one cluster has one or more other mirror clusters that are not part of the group and that each maintains a copy of messages of the created message queue that are stored on the selected single one cluster, and wherein functionality of the message queue to the client further includes writing, on each of the mirror clusters in response to the received message queue storage requests, messages for use by the client.

5. The computer-implemented method of claim 3, wherein a configuration information is specified by the client for use with the message queue and includes an indication of a quantity of the alternative clusters for the created message queue, wherein the selecting the multiple clusters for use with the created message queue includes selecting the indicated quantity of clusters to use with the created message queue, and wherein the plurality of clusters are provided by and under control of the online message queue service.

6. The computer-implemented method of claim 5 further comprising, adjusting the quantity of alternative clusters for the created message queue during use of the created message queue.

7. The computer-implemented method of claim 1, wherein a configuration information is specified by the client for use with the message queue and includes at least one of a level of reliability for the message queue or a level of availability for the queue, and wherein the selecting the multiple clusters for use with the created message queue includes determining a number of clusters to use with the created message queue to provide the at least one of the level of reliability or the level of availability.

8. The computer-implemented method of claim 1 further comprising, before writing the messages for use by the client, determining, by the one or more configured computing devices and based at least in part on the requested message queue operation, whether to attempt to write the received message queue storage requests on all of the clusters or on a single one of the clusters that is selected from the multiple clusters, and wherein the writing in response to the received message queue storage requests includes, based at least in part on the determining, attempting to store a copy of a specified message in the created message queue on all of the clusters or on the selected single one cluster.

9. The computer-implemented method of claim 1, wherein the functionality of the message queue to write the messages is achieved via invocation by a remote program of an API (application programming interface) provided by the online message queue service, and wherein the writing in response to the received message queue storage requests includes attempting to retrieve a stored copy of a particular message from the created message queue.

10. The computer-implemented method of claim 1, wherein the writing in response to the received message queue storage requests includes attempting to remove a copy of a particular message from the created message queue.

11. The computer-implemented method of claim 1, wherein a configuration information is specified by the client for use with the message queue and includes access control restrictions related to types of message queue operations that specified users are allowed to perform, and wherein the method further comprises, before writing the messages for use by the client, automatically verifying, by the one or more configured computing devices, that the received message queue storage requests is allowed based at least in part on the access control restrictions.

12. The computer-implemented method of claim 1, wherein the created message queue is associated with a plurality of remote programs, and wherein one or more first programs of the plurality that add additional messages to the created message queue are unrelated to one or more other second programs of the plurality that obtain the additional messages from the created message queue.

13. One or more non-transitory, computer-readable storage media, storing program instructions that when executed on or across one or more computing devices cause the one or more computing devices to implement:

receiving, by the one or more computing devices and for a client of an online message queue service, a request to provide a message queue for use in storing data supplied for the client;

creating, by the computing system, the message queue for the client, including selecting multiple clusters of message storage systems to use for the message queue from a plurality of clusters of message storage systems provided by the online message queue service; and providing, by the computing system, functionality of the message queue to the client, including:

writing, on the multiple clusters and in response to one or more received message queue storage requests, messages for use by the client; and sending, in response to one or more received message queue retrieval requests, at least some of the stored messages for the client from the multiple clusters.

14. The one or more non-transitory, computer-readable storage media of claim 13, wherein the program instructions include instructions that, when executed, further configure the one or more computing devices to notify the client of successful writing of the received message queue storage requests when at least one of the writes succeeds.

15. The one or more non-transitory, computer-readable storage media of claim 13, wherein the online message queue service provides an API (application programming interface) for use by clients of the online message queue service, and wherein the received message queue storage requests are received from the client via use of the API by a remote program operating on behalf of the client.

16. The one or more non-transitory, computer-readable storage media of claim 13, wherein a configuration information is specified by the client for use with the message queue and includes at least one of a level of reliability for the message queue or a level of availability for the queue, and wherein the selecting the multiple clusters for use with the created message queue includes determining a number of clusters to use with the created message queue to provide the at least one of the level of reliability or the level of availability.

17. A system, comprising:
one or more processors of one or more computing systems; and
a message queue service that, when executed by at least one of the one or more processors, causes the at least one processor to:
receive, by one or more configured computing devices of an online message queue service and for a client of the online message queue service, a request to provide a message queue for use in storing data supplied for the client;
create, by the one or more configured computing devices, the message queue for the client, including selecting multiple clusters of message storage systems to use for the message queue from a plurality of clusters of message storage systems provided by the online message queue service; and
provide, by the one or more configured computing devices, functionality of the message queue to the client, including:
writing, on the multiple clusters and in response to one or more received message queue storage requests, messages for use by the client; and
sending, in response to one or more received message queue retrieval requests, at least some of the stored messages for the client from the multiple clusters.

18. The system of claim 17, wherein the writing of the messages includes attempting to write on each of the multiple clusters, and wherein to provide, by the one or more configured computing devices, the functionality of the message queue to the client the further comprises notifying the client of successful writing of the received message queue storage requests when at least one of the writes succeeds.

19. The system of claim 17, wherein the message queue service provides an API (application programming interface) for use by clients of the message queue service, and wherein a message queue usage request that indicates the received message queue storage requests is received via use of the API by a remote program operating on behalf of the client.

20. The system of claim 17, wherein a configuration information is specified by the client for use with the message queue and includes at least one of a level of reliability for the message queue or a level of availability for the queue, and wherein the selecting the multiple clusters for use with the created message queue includes determining a number of clusters to use with the created message queue to provide the at least one of the level of reliability or the level of availability.

* * * * *